US012708831B1

(12) United States Patent
Hamed

(10) Patent No.: US 12,708,831 B1
(45) Date of Patent: Aug. 18, 2026

(54) BICYCLE COMPUTER WITH WIND AND POSTURE SENSING

(71) Applicant: Hazem Nihad Hamed, New Smyrna Beach, FL (US)

(72) Inventor: Hazem Nihad Hamed, New Smyrna Beach, FL (US)

( * ) Notice: Subject to any disclaimer, the term of this patent is extended or adjusted under 35 U.S.C. 154(b) by 0 days.

(21) Appl. No.: 19/553,427

(22) Filed: Mar. 1, 2026

(51) Int. Cl.

| | |
|---|---|
| ***B62J 45/20*** | (2020.01) |
| ***A63B 24/00*** | (2006.01) |
| ***A63B 71/06*** | (2006.01) |
| ***B62J 45/414*** | (2020.01) |
| ***B62J 45/415*** | (2020.01) |
| ***B62J 50/22*** | (2020.01) |
| ***G06V 40/16*** | (2022.01) |

(52) U.S. Cl.
CPC ...... *A63B 71/0622* (2013.01); *A63B 24/0062* (2013.01); *B62J 45/20* (2020.02); *B62J 45/414* (2020.02); *B62J 45/415* (2020.02); *B62J 50/22* (2020.02); *G06V 40/171* (2022.01); *A63B 2208/02* (2013.01); *A63B 2220/12* (2013.01); *A63B 2220/17* (2013.01); *A63B 2220/30* (2013.01); *A63B 2220/40* (2013.01); *A63B 2220/807* (2013.01); *A63B 2225/02* (2013.01); *A63B 2225/50* (2013.01); *A63B 2230/062* (2013.01); *A63B 2230/625* (2013.01)

(58) Field of Classification Search
CPC ............ A63B 71/0622; A63B 24/0062; A63B 2208/02; A63B 2220/12; A63B 2220/17; A63B 222/30; A63B 2220/40; A63B 2220/807; A63B 2225/02; A63B 2225/20; A63B 2225/50; A63B 2230/062; A63B 2230/625; B62J 45/415; B62J 45/20; B62J 50/22; B62J 45/414; G06V 40/171
USPC .......................................................... 340/432
See application file for complete search history.

(56) References Cited

U.S. PATENT DOCUMENTS

| | | | |
|---|---|---|---|
| 7,874,567 | B2 | 1/2011 | Ichida et al. |
| 8,429,061 | B2 | 4/2013 | Shirai |
| 8,458,080 | B2 | 6/2013 | Shirai |
| 8,655,548 | B2 | 2/2014 | Ichida et al. |
| 9,026,053 | B2 | 5/2015 | Molettiere et al. |
| 9,229,712 | B2 | 1/2016 | Takamoto et al. |
| 9,491,788 | B1 | 11/2016 | Kasai et al. |
| 10,370,056 | B2 | 8/2019 | Komatsu et al. |
| 10,640,171 | B2 | 5/2020 | Hamed |

(Continued)

*Primary Examiner* — Naomi J Small

(57) ABSTRACT

A bicycle computer with a graphical user interface making use of atmospheric pressure sensor for gauging encroaching wind speeds for display to a cyclist through a wind speed gauge and a cyclist face features camera for detection of the cyclist upright and aerodynamic postures for accurate cycling power estimation through proper identification of the cyclist wind resistance and thereof presentation on the graphical user interface of the bicycle computer thereby alleviating the need for mechanical force and torque sensing devices typically necessary for accurate cycling power measurements. Estimation of the cyclist aerodynamic resistance coefficients for upright and aerodynamic postures are derived through aerodynamic calibration routines and the cyclist riding posture recorded by the camera for subsequent comparison to assumed position in real time for identification and application of the proper cyclist aerodynamic resistance coefficient in the power estimation algorithm.

9 Claims, 17 Drawing Sheets

(56) References Cited

U.S. PATENT DOCUMENTS

| | | | | |
|---|---|---|---|---|
| 11,046,390 | B2 | 6/2021 | Hamed | |
| 11,077,968 | B2 | 8/2021 | Hamed | |
| 11,345,441 | B2 | 5/2022 | Hamed | |
| 11,479,323 | B2 | 10/2022 | Hamed | |
| 11,565,766 | B2 | 1/2023 | Kosaka | |
| 11,767,082 | B2 | 9/2023 | Hamed | |
| 11,787,504 | B2 | 10/2023 | Hamed | |
| 11,794,856 | B2 | 10/2023 | Hamed | |
| 12,060,129 | B2 | 8/2024 | Garnica | |
| 12,240,562 | B2 | 3/2025 | Kehong et al. | |
| 2015/0019062 | A1* | 1/2015 | Previdi | B62M 6/90 180/220 |
| 2017/0074897 | A1* | 3/2017 | Mermel | A63B 69/16 |
| 2023/0381586 | A1* | 11/2023 | Erickson | G16H 20/30 |
| 2025/0032857 | A1* | 1/2025 | Schaefer | A63B 24/0087 |
| 2025/0281796 | A1* | 9/2025 | Chou | A63B 24/0062 |

* cited by examiner

| Sample Pressure Differential Calculations | | | | | | | |
|---|---|---|---|---|---|---|---|
| No | Time | Feet_Delta | Total_Miles | Avg_Speed_MPH | Wind_Speed_MPH | DP_hPa | Raw_P_hPa |
| 1 | 19:12:21 | 0 | 0 | 0 | N/A | N/A | N/a |
| 10 | 19:16:48 | 131.21 | 0.27 | 8.14 | 16.81 | -0.4454 | 9.9037 |
| 20 | 19:18:34 | 313.52 | 0.75 | 21.35 | 19.27 | -0.5852 | 9.7639 |
| 40 | 19:22:04 | 531.62 | 2.25 | 36.22 | 36.74 | -2.1281 | 8.221 |
| 50 | 19:24:26 | 748.01 | 3.28 | 50.96 | 58.07 | -5.3159 | 5.0332 |
| 60 | 19:26:11 | 714.65 | 4.51 | 48.67 | 47.61 | -3.5729 | 6.7762 |
| 70 | 19:28:03 | 540.22 | 5.56 | 36.77 | 28.4 | -1.2716 | 9.0775 |
| 80 | 19:29:47 | 206.99 | 6.81 | 12.86 | 4.48 | -0.0316 | 10.3175 |
| 90 | 19:31:34 | 209.36 | 7.78 | 14.26 | 16.47 | -0.4273 | 9.9218 |
| 100 | 19:33:19 | 328.09 | 8.65 | 20.35 | 17.34 | -0.4741 | 9.875 |
| 108 | 19:35:31 | 51.43 | 8.92 | 1.4 | 12.91 | 0.2625 | 10.6117 |

FIG. 6

DARK

78%

42

43

44

Setup

Settings

Calibrate

39

Operate

41

Data List

Charts

Map

40

Diagnostics

60

70

80 ph

49 fficient 1.0

10

MAP

201

BICYCLE COMPUTER WITH WIND AND POSTURE SENSING

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The disclosed invention relates to the cycling transportation and sporting industry, specifically to modern bicycle computers offering the cyclist riding information such a bicycle speed and location information as well as route mapping through addition of onboard global positioning sensors (GPS). With further advancement in wireless communication such as Bluetooth low Energy (BLE) leading to development of additional cycling sensors such as cadence and speed sensors as well as with heart rate monitors, recent Bicycle Computers with thereof implementations additionally offer the cyclist more accurate speed information, cycling cadence rates and heartbeat rates critical to the safety of the cyclist. With further advancement in the art leading to development of commercially available cyclist force and torque sensing devices with thereof implementation additionally offering the cyclist exerted power information, attempts by Bicycle Computer manufacturers to estimate power without such devices, however desirable and readily available, remain based on crude methods and estimates.

BACKGROUND OF THE INVENTION

Bicycles have existed for many years serving throughout as transportation and sporting means. Over the great time span since their inception, the technology has evolved with numerous designs and advancements predominantly geared toward addressing rider comfort. The initial bicycle single speed powertrain design comprising one chainring and one sprocket from so many years ago evolved through addition of power transmission sprockets in the axial directions in the free hub rear drive wheel as well additional chainrings in the pedals assembly with thereof implementation relying on mechanical four bar linkage derailleurs for shifting resulting in the de-facto bicycle lightweight sporting powertrain used to this very day. Further advancements included electrical derailleurs offered henceforth with electronic controls with rider buttons for shifting. With recent advancements in low power microprocessors, advancement in a parallel however related art evolved, leading to development and deployment of commercial Bicycle Computers. With the latter offering the rider, whether equipped with electrical or manual derailleurs, relevant cycling information like speed, cadence, and often power measurements both estimated as well as making use of dedicated torque or pedals force measurement hardware.

Impairment to advancement in the art predominantly stemmed from lack of standardization of commercially available products with each OEM promoting proprietary and poorly documented designs, lack of initiatives to invest in the art thereby relying on arcane control means comprising pushbuttons and LED's for derailleur calibration and adjustments, and third party suppliers trying to satisfy all with incomprehensive user interfaces with minimal integration to any given line of products.

A somewhat dark area for Bicycle Computers offering the rider power information using estimation methods relying on GPS elevation information to gauge hill climbs and GPS acceleration estimates based on consecutive speed readings remained somewhat incomplete as power consumption is additionally related to wind speed which cannot be estimated without dedicated wind measurement devices adding complexity and cost with an invariably diminished point of return leading to most cycling applications to neglect the wind speed altogether and rely solely on the bicycle speed with often a manually entered rider aerodynamics resistance coefficient based on the rider frontal area and rider coefficient of drag notwithstanding the rider posture, to derive somewhat close but often crude power measurement readings.

As a consequence, an improved Bicycle Computer better fitted for estimation of power through implementation of accelerometers to aid in the derivation of instantaneous acceleration, gyroscope capability to gauge instantaneous climbs and descends along with an onboard wind sensor and a rider wind resistance posture identifying sensor all working together through a custom fit microprocessor software application program to derive a better power estimate for the rider remains elusive.

DISCUSSION OF PRIOR ART

The following is a brief summary of prior art found of most relevance to the Bicycle Computer with Wind and Posture Sensing of the present invention.

U.S. Pat. No. 12,471,805 B2 discloses a method for analyzing the posture of a cyclist, however entails the proposed method relies on a multiplicity of sensors rather than an optical camera.

U.S. Pat. No. 12,391,327 B2 discloses an automatic bicycle identification system relying on wireless communication.

U.S. Pat. No. 12,515,754 B2 discloses a safety warning apparatus for a bicycle rider using a radar.

U.S. Pat. No. 12,375,872 B2 discloses yet another safety warning device using an ultra wideband radio.

U.S. Pat. No. 11,952,069 B2 discloses a bicycle computer with an aerodynamic profile with disclosure thereof predominantly geared toward the mechanical design of the housing rather than the functionality of the device.

U.S. Pat. No. 11,319,018 B2 discloses a control system for a bicycle taking elevation into consideration of with resultant criteria for controlling power transmission and vehicle suspension predominantly for addressing comfort of the cyclist.

Notwithstanding the afore stated endeavors in the art, a Bicycle Computer with highly accurate cyclist power estimation through sensing of wind speeds and rider posture for application of a proper wind resistance coefficient for the rider in order to accurately gauge wind resistance to cycling, could not be found.

BRIEF SUMMARY OF THE INVENTION

Applicant hereby discloses a Bicycle Computer implementation of a commercial mobile phone running a proprietary application program with a user friendly touchscreen interface and an advanced computer algorithm capitalizing on readily available phone GPS and GNSS information for power estimation for a bicycle rider through evaluation of average speeds, accelerations and inclination with the power estimation logic furthermore making use of the phone accelerometers and gyroscope data for improved estimation of rider exerted cycling power through incorporation of real time measurements of acceleration and inclination. Additionally, through extensive testing and software development, applicant has adapted the phone pressure sensor to act as an accurate wind sensor for a high confidence measurement of headwind and tailwind speeds. Through the use of a standard bicycle mount serving to accurately position the mobile phone microphone port, where the phone pressure sensor is invariably located, in an open area above bicycle steering column stem, applicant has derived a high accuracy wind speed measurements apparatus with further high immunity to cross winds through strategic placement of the proposed Bicycle Computer between the rider arms invariably located either on the handlebars or handlebar grips, leading to real time measurement of headwind speed forces impacting rider body for more accurate estimation of rider exerted cycling power. Last, with elevation differentials additionally impacting the mobile phone pressure sensor readings, a zeroing algorithm for the base pressure readings upon which the pressure differential readings are taken, is implemented upon the rider coming to a full stop in the disclosed apparatus so that the pressure differential measurements are independent of the rider's altitude.

With the most challenging force of rider power estimation for a Bicycle Computer being the rider wind resistance which is invariably related to the rider posture, applicant discloses an augment to the disclosed wind speed measurement apparatus comprising detection of the rider posture on a bicycle using the front camera of the mobile phone device to determine the rider posture. Through a camera calibration routine taking a camera snapshot of the rider upright posture and another snapshot of the rider aerodynamic sport posture with thereof distinction made using percentage occupation of the riders face features to the camera field of view, the proposed apparatus is able to identify the rider posture during cycling. A complete rider aerodynamic profile is then established for each riding posture of the rider through a calibration routine where the rider decelerates on a level road under low or no wind conditions without operation of the bicycle pedals from a prespecified speed to a nominal speed with the proposed software algorithm serving to evaluate the rider aerodynamic resistance coefficient defined as the rider frontal area multiplied by the rider wind drag coefficient, through the resultant retarding wind force acting against the rider momentum based on the known rider and bicycle mass and speed. With the only additional force impacting the calibration result being the bicycle frictional losses in the wheels and tires, the dynamic computation result is adjusted by a constant multiplied by the rider mass with the rider being well informed that accuracy of the calibration routine is highly dependent on a well lubricated bicycle wheel bearings. Finally, through periodic activation of the front camera during a cycling routine, the proposed software algorithm is able to distinguish between the two riding postures and apply the proper measured rider aerodynamic resistance coefficient for accurate estimation of wind retarding forces.

With the three force components of the law of conservation of energy, acceleration, inclination and wind retarding forces thereby available with a high degree of certainty, accurate estimation of cycling forces is made. Along with readily available means to gauge cycling speeds, a Bicycle Computer with a high confidence cycling power estimation is hereby disclosed.

Additionally, it is incumbent to stress that disclosed computer application and user interface is being disclosed as a standalone Bicycle Computer routine for estimation of power as well as an augment to an automatic bicycle derailleur shifting application further incorporating the rider exerted effort in the shifting algorithm. Furthermore, although not needing to be stated, the disclosure equally applies to commercial Bicycle Computers based on original equipment designs currently lacking any wind measurement capability, pressure sensors or cameras identifying the rider posture. Addition of any of either type of the disclosed sensors is clearly within the scope of this disclosure.

Finally, it is of paramount importance to note that the disclosed pressure sensor and camera posture sensor complement each other in achieving the sole purpose of being able to gauge resistance forces to motion of the cyclist caused by encroaching wind in order to reach an acceptable estimate for exerted effort thereby offering the cyclist an alternative to force and torque measuring devices able to gauge cycling forces and therefore power with less than 5 percent error. As knowing the wind speed without knowing the rider posture or basing the power calculation on an approximation of the CdA, Aerodynamic resistance coefficient, which can vary by more than 40 percent between a rider upright and aerodynamic postures would be self-defeating with thereof results simply unacceptable, determination of both factors is necessary. On the other hand, a simple application of both devices for basing the power calculation on the effect of power input, acceleration, climb and wind resistance rather than the cycling effort, is able to produce results on the order of 5 percent, with the error derivative in this estimate clearly stemming from the wind resistance measurement alone just to demonstrate thereof criticality, would be found acceptable. Therefore, the proposed indirect cyclist power measurement apparatus, although less accurate than direct force measurement nevertheless, should offer the cyclist an option through added value to the Bicycle Computer without the additional hardware complexity of force and torque measuring components.

BRIEF DESCRIPTION OF THE DRAWINGS

FIG. 6 is table depicting a truncated record of a cycling trip demonstrating the relation between the pressure drop of the pressure sensor of the preferred embodiment of the Bicycle Computer with Wind and Posture Sensing of the present invention, and the bicycle road speed.

DETAILED DESCRIPTION OF THE INVENTION

Figure 1:
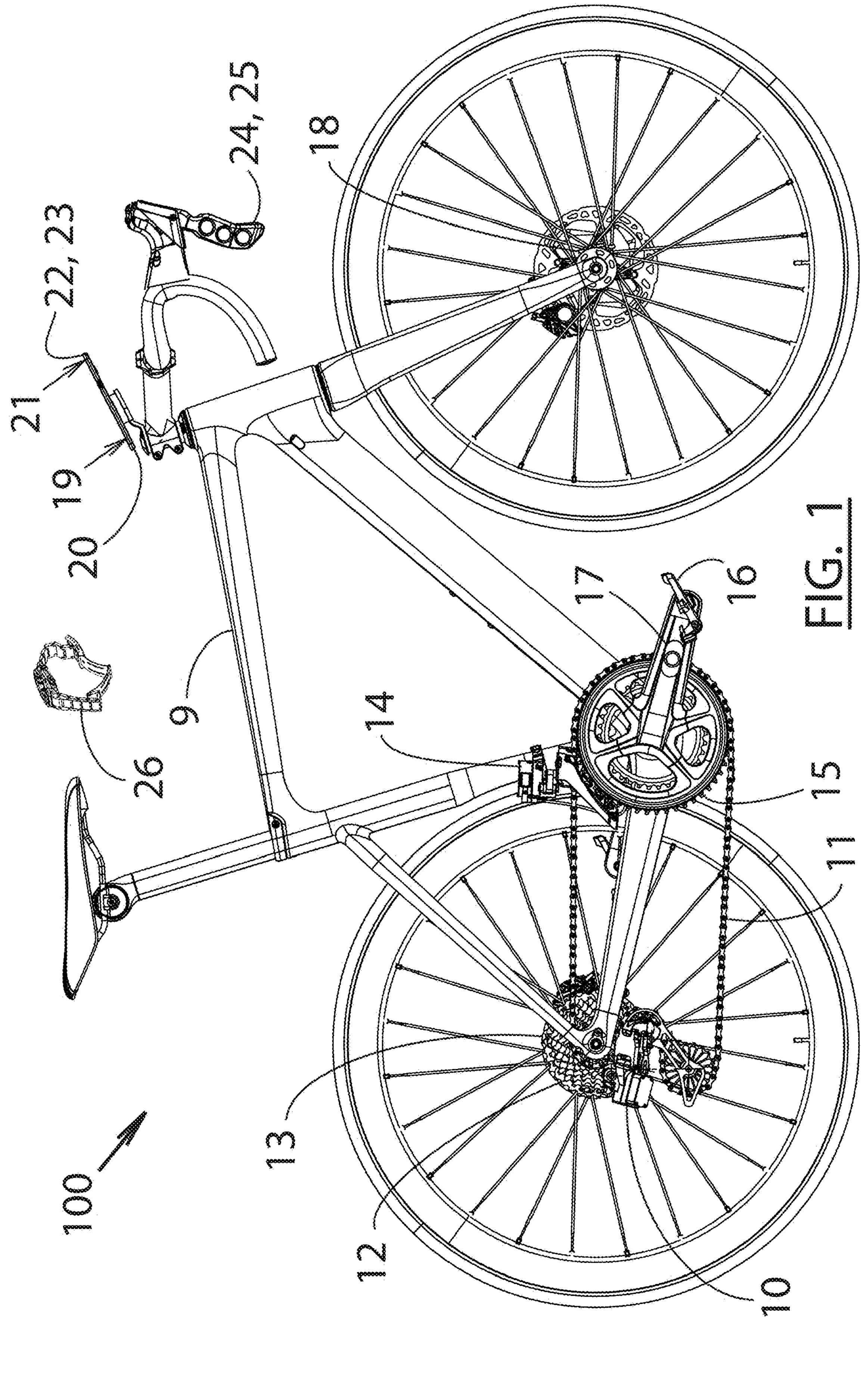
FIG. 1 is an overall view of the mechanical and electrical components of a bicycle making use of the preferred embodiment of the Bicycle Computer with Wind and Posture Sensing of the present invention.
Figure 2:
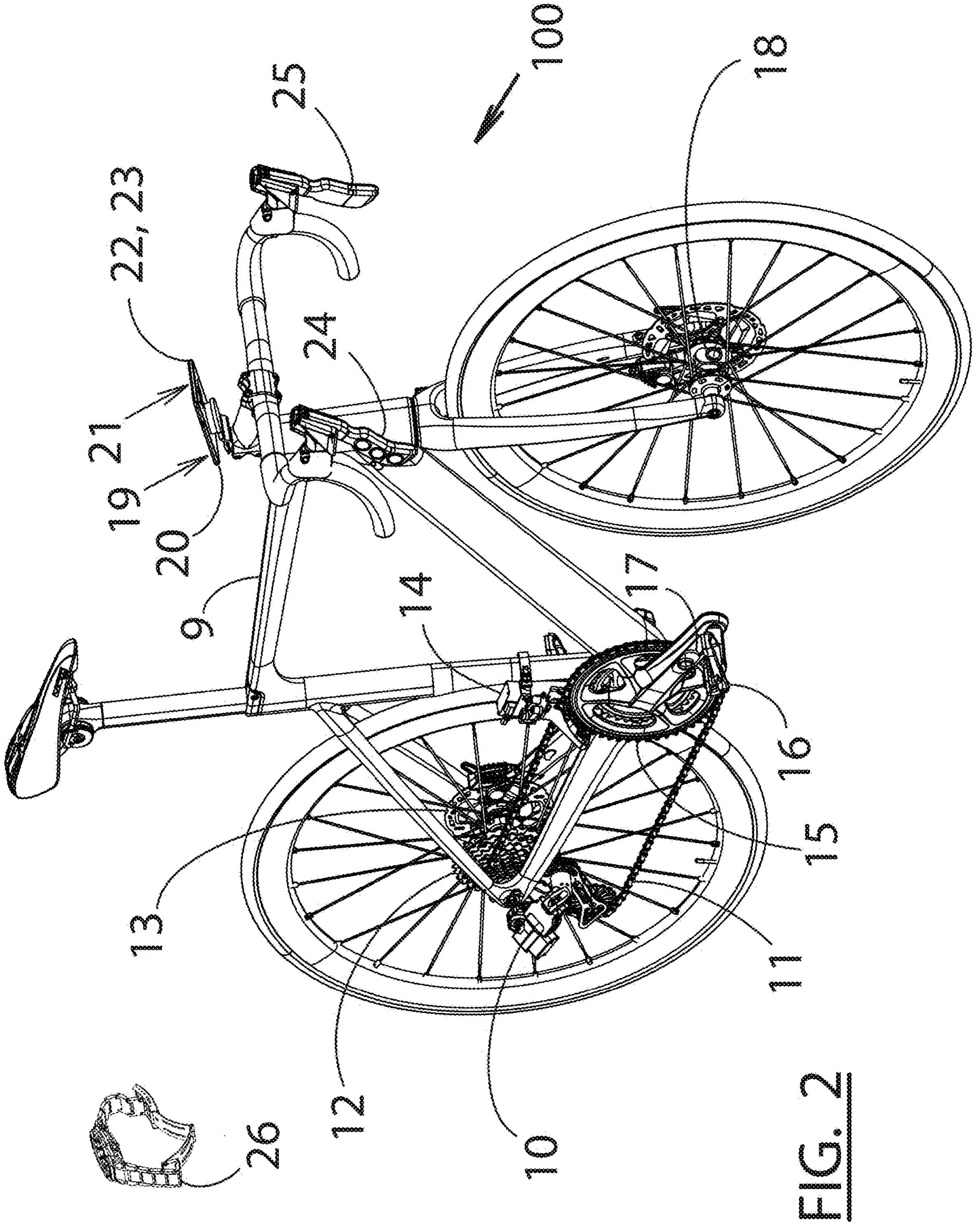
FIG. 2 is a dimetric view of the mechanical and electrical components of a bicycle making use of the preferred embodiment of the Bicycle Computer with Wind and Posture Sensing of the present invention.
Figure 3:
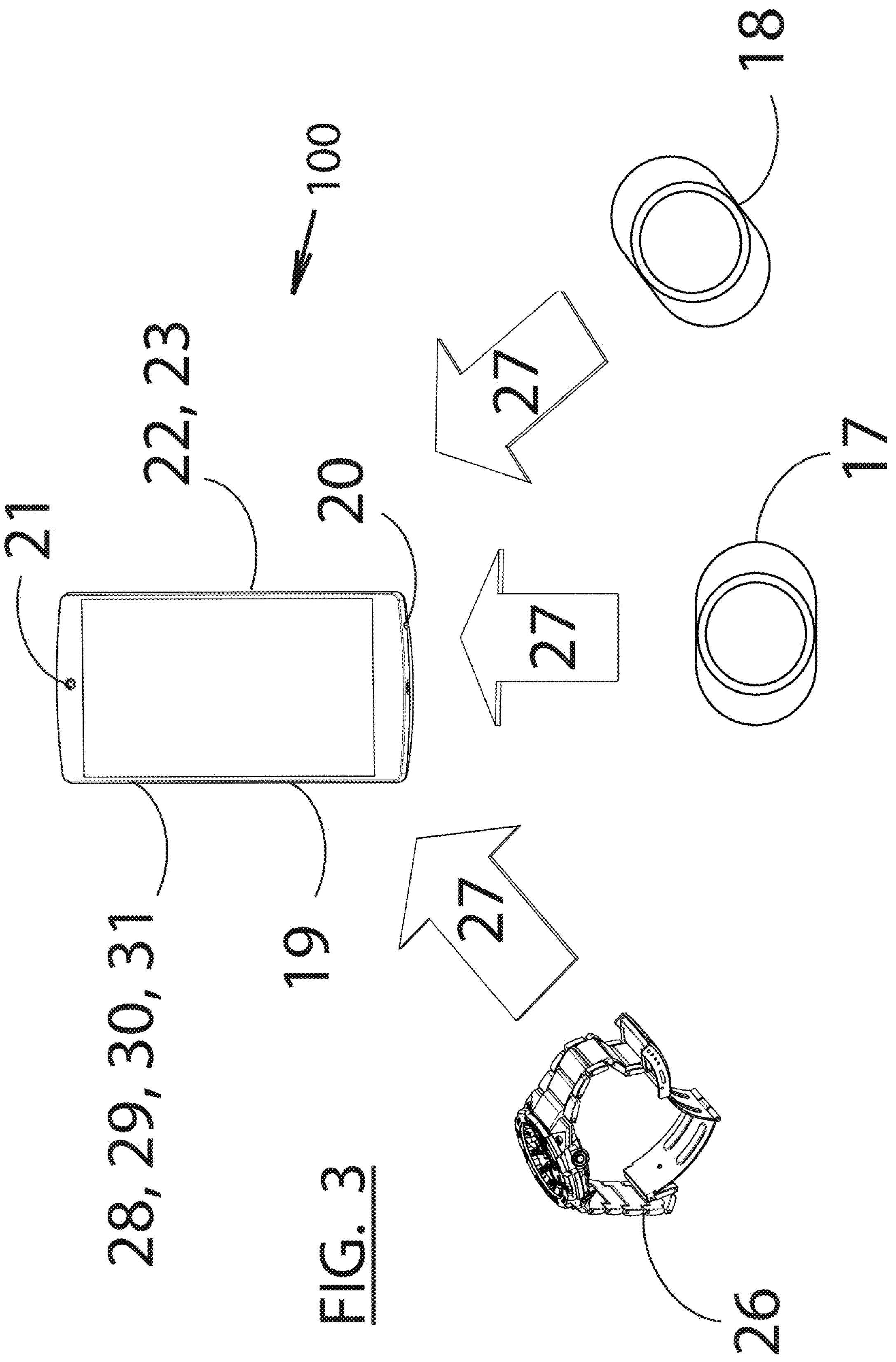
FIG. 3 is a system architecture view depicting the proposed components of the preferred embodiment of the controls apparatus of a bicycle making use of the preferred embodiment of the Bicycle Computer with Wind and Posture Sensing of the present invention.

Preferred Embodiment Construction—FIGS. 1-3

With reference to FIGS. 1-3, the preferred embodiment 100 of a bicycle making use of the preferred embodiment Bicycle Computer with Wind and Posture Sensing of the present invention comprise bicycle frame 9, rear derailleur 10 serving to alternate chain 11 between cassette sprockets 12 of rear free hub assembly 13, front derailleur 14 serving to alternate chain 11 between chainrings 15 rotationally affixed to front pedals assembly 16, wireless cadence sensor 17 affixed to bicycle pedals assembly 16, wireless bicycle speed sensor 18 affixed to front wheel hub of the preferred embodiment bicycle 100, Bicycle Computer 19 with integral wind sensor 20 and front camera 21, user graphical interface 22 running on application program (APP) 23 of Bicycle Computer 19, right brake shifter 24, left brake shifter 25, and heartbeat rate and oxygen monitor 26 such as a watch as depicted herein or possibly some other wearable devices for the rider.

Although the preferred embodiment 100 of a bicycle making use of the preferred embodiment Bicycle Computer with Wind and Posture Sensing of the present invention is depicted making use of wireless electrical front and rear derailleurs, the disclosed apparatus is equally applicable to manual rear and manual front derailleurs with manual triggers or equivalent shifters.

Last, it is additionally stressed that although this disclosure focuses on the application of the disclosed apparatus as a Bicycle Computer with no relation to shifting, it is equally applicable as an automatic shifting apparatus incorporating rider exerted effort into the automatic shifting logic.

Bicycle Computer Components—FIG. 3

With reference to FIG. 3, the implementation of a standard mobile phone pressure sensor for wind speed measurements in the preferred embodiment Bicycle Computer with Wind and Posture Sensing of the present invention makes use of programmed logic of application program (APP) 23 for rapid acquisition of signal of integral pressure sensor 20 of Bicycle Computer 19, filtering and averaging along with other signal conditioning routines, and with the final analysis entailing comparison to base pressure signal acquired while the bicycle is at rest for derivation of pressure signal differentials, and thereof resolution into bicycle wind speeds. Application program (APP) 23 of Bicycle Computer 19 additionally acquires Bluetooth Low Energy (BLE) signals 27 of rider heartbeat and rider oxygen level information from heartbeat rate monitor 26, rider pedaling rate from cadence sensor 17 and bicycle speed from bicycle speed sensor 18, and through acquisition and evaluation of signals from accelerometers 28, gyro 29, magnetometer 30 and Global Positioning Sensor (GPS) 31, Bicycle Computer 19 additionally gathers and dispatches information about rider position including longitude, latitude, bearing and elevation, speed, acceleration and road inclination, and through additional use of front camera 21 of Bicycle Computer 19 to detect rider posture, application program (APP) 23 computes in real time exerted effort by the rider and dispatches the exerted power information to the rider through graphical user interface 22 along with measured wind speed, bicycle speed, acceleration, cadence and other computed results.

Figure 4:
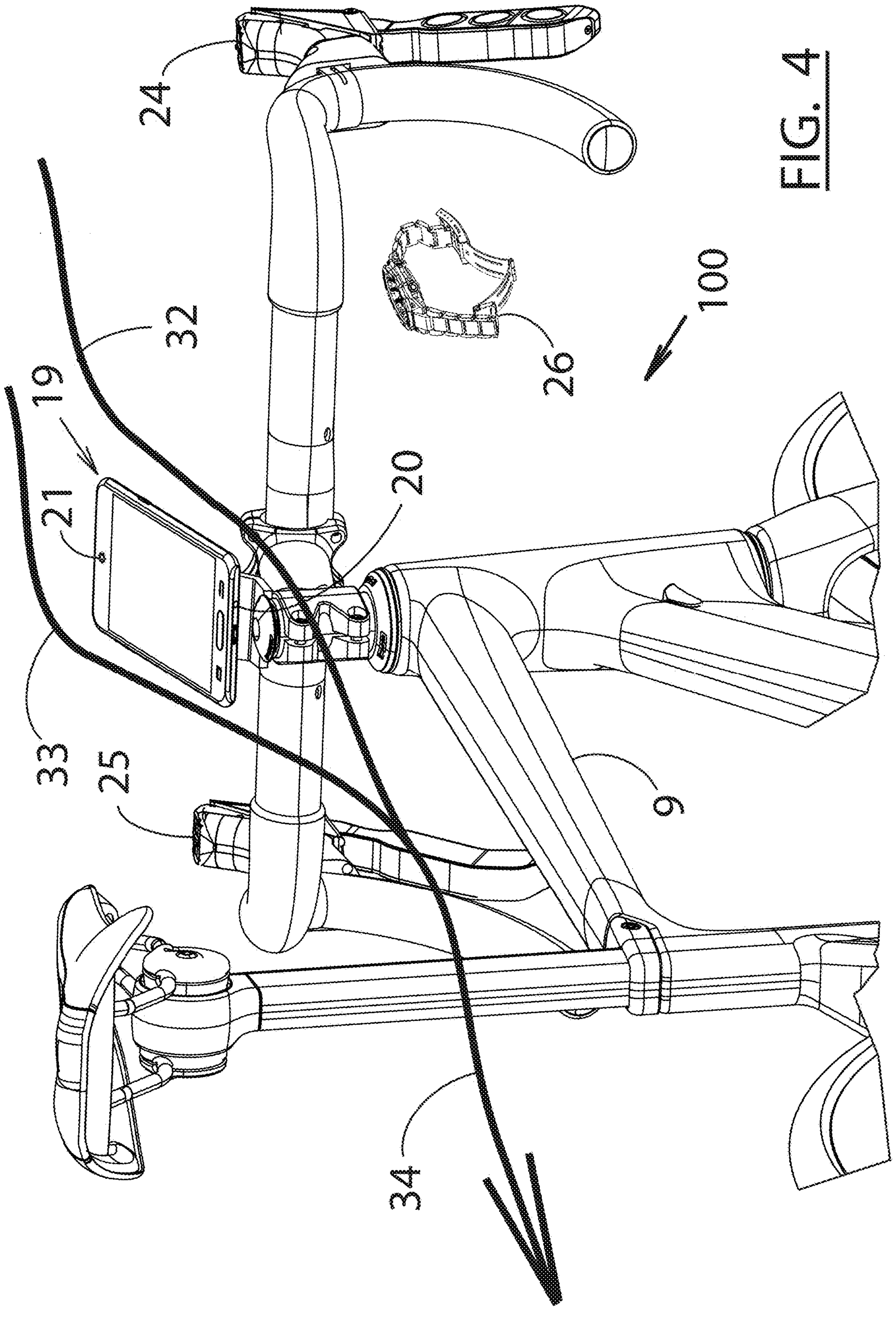
FIG. 4 is an oblique view depicting headwind flow for the preferred embodiment of the Bicycle Computer with Wind and Posture Sensing of the present invention.
Figure 5:
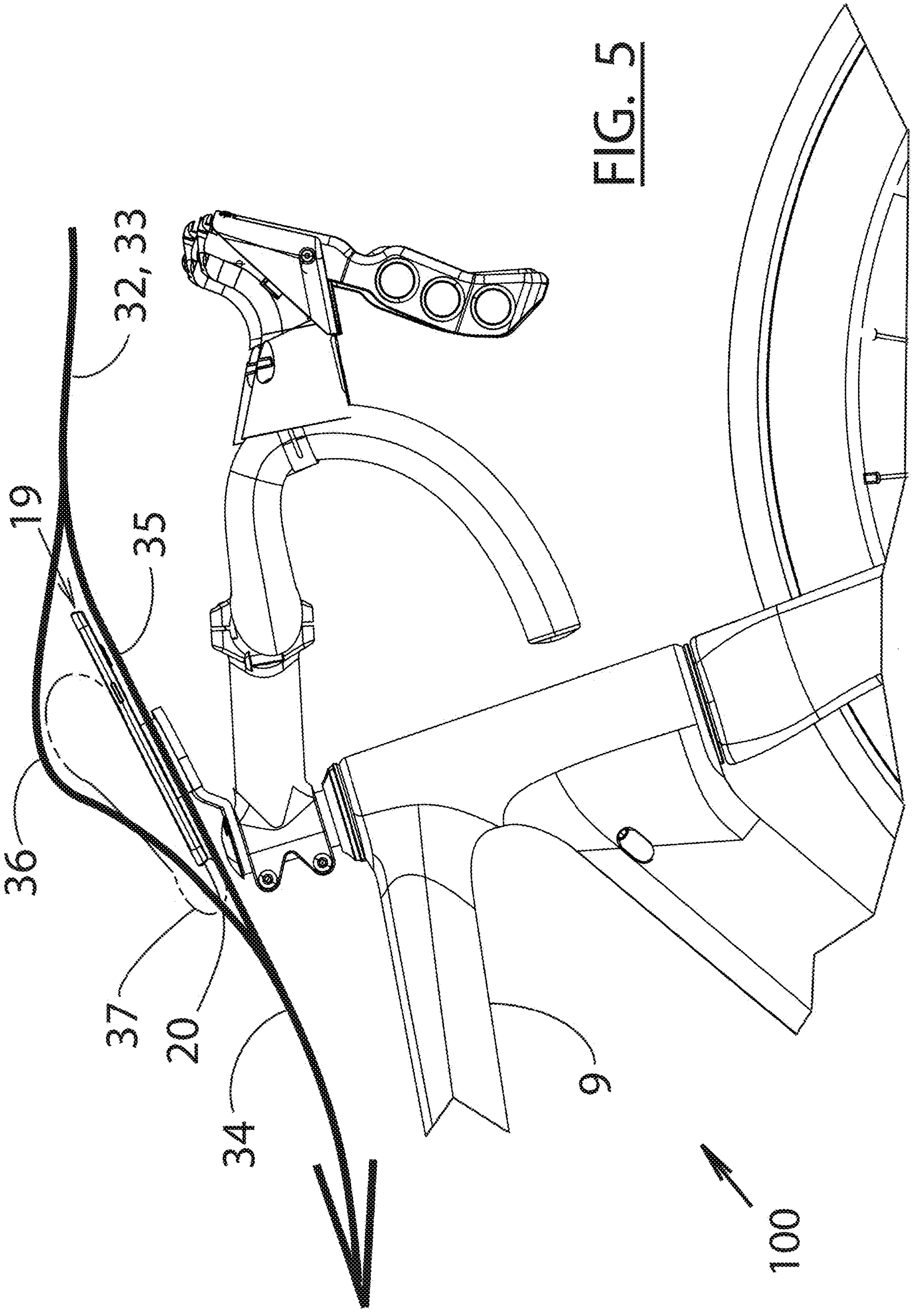
FIG. 5 is side view depicting air boundary layer separation of the headwind flow and the standard bicycle mounting position of the preferred embodiment of the Bicycle Computer with Wind and Posture Sensing of the present invention.

Mobile Phone Pressure Sensor Implementation—FIGS. 4 & 5

With reference to FIGS. 4 & 5, the implementation of a standard mobile phone pressure sensor for wind speed measurements in the preferred embodiment 100 of a bicycle making use of the preferred embodiment Bicycle Computer with Wind and Posture Sensing of the present invention comprise the use of the body of Bicycle Computer 19 as an airfoil using a standard bicycle mount placing the device in a typical open area with an angle of attack to encroaching wind of around 20 degrees thereby forcing encroaching airstream to split into right wind stream 32 and left wind stream 33 before merging into final wind stream 34 however obstructed by the rider, far enough from enumerated wind streams 32 and 33 to impact their wind speed, with simplified depiction thereof in dimetric view in FIG. 4 illustrating this relation and with simplified lateral view illustration in FIG. 5 depicting the boundary layer separation and the air stream split resulting in a pressure rise (airfoil lift) due to the somewhat stagnated air flow for moderate wind speed stream 35 below Bicycle Computer 19 and the higher wind speed stream 36 with longer travel path above Bicycle Computer 19 consequentially creating low pressure air zone 37, and with subsequent acceleration of air stream 36 back toward the body of the airfoil to merge with lower boundary layer wind stream 35 causing the lower pressure zone 37 with thereof pressure drop to extend over the pressure sensor port of Bicycle Computer 19 before convergence to wind stream 34 causing a pressure drop in pressure sensor 20 of Bicycle Computer 19 found to be predominantly proportionate to the mathematical square of the encroaching wind speed closely following Bernoulli's principle. Furthermore, to further highlight the importance of an accurate wind measurement apparatus for gauging rider effort, it is incumbent to stress that power, being the product of force and speed, along with the wind force being a major component in the force component of power at higher speeds, power becomes predominantly proportional to the cube of the speed at higher speeds resulting in the wind speed quickly turning into the dominant retarder the rider must overcome to maintain a given high bicycle speed.

Analysis of Wind Speed Measurement—FIG. 6

With reference to FIG. 6, recorded data from an experimental implementation of a standard mobile phone pressure sensor for wind speed measurements in the preferred embodiment 100 of a bicycle making use of the preferred embodiment Bicycle Computer with Wind and Posture Sensing of the present invention highly confirms the validity of classical fluid mechanics results for an airfoil with a finite breadth incurring a pressure rise at the leading edge due to the stagnation of impending air flow and a pressure drop at the trailing edge due to separation of the air boundary layer at a zero angle of attack. Furthermore, it is concluded that this relation is highly prevalent for angles of attack of up to a least 20 degrees with the results in table in FIG. 6 confirming the relation of the bicycle road speed to the pressure drop of pressure sensor 20 of Bicycle Computer 19 leading to the calculated resultant averaged and normalized wind speed shown in the table of FIG. 6. It is further concluded that the fractional signal to noise ratio below 10 miles per hour at around .044 hpa in differential pressure largely on the order of pressure measurement noise is inadequate for calculation of lower wind speeds with that ratio becoming highly relevant at higher wind speeds with a differential pressure rise to above 5.3 hpa at around 50 miles per hour leading to computation of resultant wind speeds above 10 to 15 miles per hour with high certainty. Although suffering somewhat at lower speeds, this result nevertheless, adds to the applicability of the forgoing wind sensor implementation for cycling as the wind resistance of the rider is highly proportional to the mathematical square of the speed with rider power, as stated prior, being predominantly proportionate to the cube of the wind speed, leading to the rider wind resistance becoming highly dominant at higher speeds where the measurements typically take place with a non-negotiable positive certainty. It is additionally necessary to point out that variations in the recorded pressure differentials and wind speeds depicted in FIG. 6 do not necessarily negatively reflect on the accuracy of the disclosed apparatus as they are more likely related to wind gusts of a random nature and turbulence from periodic riding in the wake of passing vehicles.

Additionally, the results in table in FIG. 6 have been condensed with presentation of every 10th reading on 1 second intervals with the underlying pressure signal acquisition taking place at 10 Hz and being mathematically averaged on 1 second intervals. It is further clear that this relation is additionally dependent on temperature with lower air density at higher temperatures negatively affecting the pressure differential. While at least from a theoretical standpoint, this relation should be linear, it is nonetheless subject to further testing and evaluation. Further improvements to the pressure acquisition algorithm in the foregoing apparatus are not limited to automatic zeroing of the pressure differential readings upon the rider coming to a full stop in order to account for changes in elevation affecting the base pressure readings. Finally, it is clear that the data in the presented table was a product of the capability for the Bicycle Computer 19 to record and communicate trip data for the rider with the table in FIG. 6 having been condensed with removal of date, longitude, latitude, bearing, elevation and average acceleration.

Figure 7A:
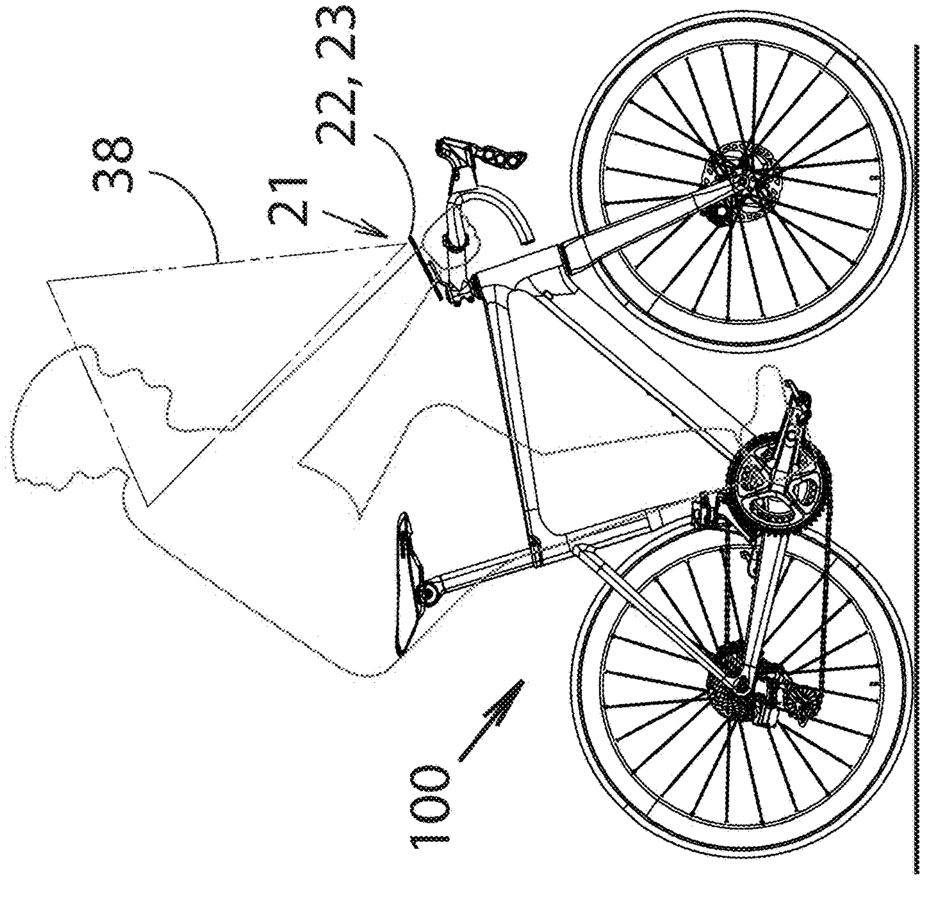
FIG. 7A is a side view of a bicycle rider depicting the relation of the rider face features to the field of view of the front camera rider posture sensor of the preferred embodiment of the Bicycle Computer with Wind and Posture Sensing of the present invention with the rider in an upright position.
Figure 7B:
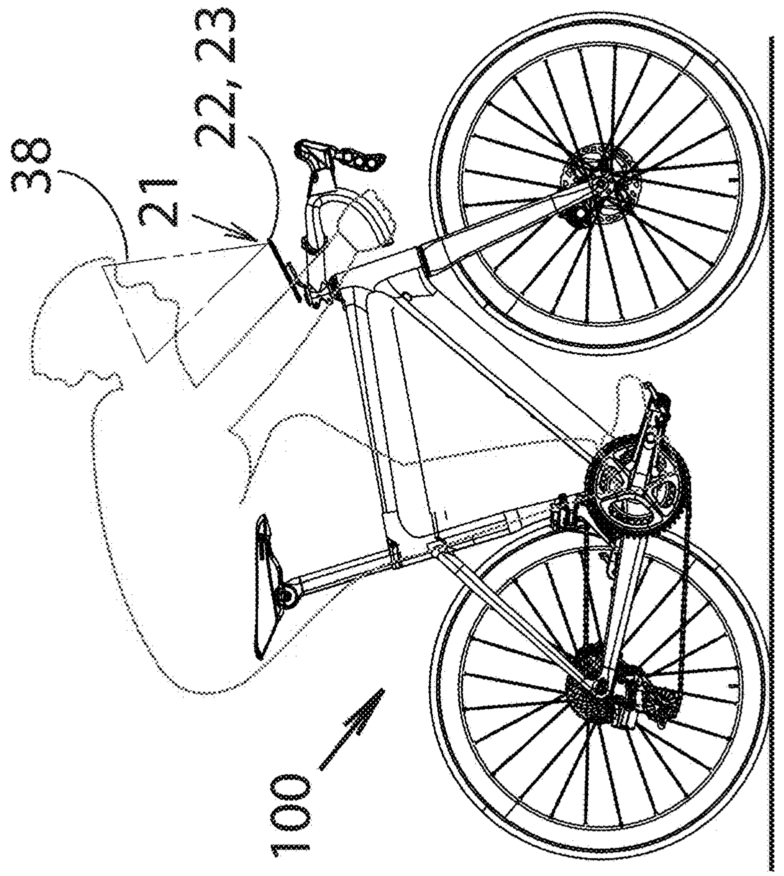
FIG. 7B is a side view of a bicycle rider depicting the relation of the rider face features to the field of view of the front camera rider posture sensor of the preferred embodiment of the Bicycle Computer with Wind and Posture Sensing of the present invention with the rider in an aerodynamic position.

Bicycle Computer Posture Sensor—FIGS. 7A & 7B

With reference to FIGS. 7A & 7B, application of the phone camera to detect the posture of the cyclist is being illustrated for the preferred embodiment 100 of a bicycle making use of the preferred embodiment Bicycle Computer with Wind and Posture Sensing of the present invention. Through the use of a standard software library specifically written to detect the outline of a user face features, application program (APP) 23, executes periodic activation of the front camera 21 of Bicycle Computer 19, arbitrarily on the order of an interval of 2 to 5 seconds, optionally related to the speed of the bicycle, and through evaluation of occupation percentage of the rider's face features in the field of view 38 of camera 21 of Bicycle Computer 19, differentiation is drawn between an upright posture, as depicted in FIG. 7A, where the face of the rider occupies a low percentage of field of view 38 of camera 21, and a rider aerodynamic posture depicted in FIG. 7B, where the rider is closer to camera 21 leading to the rider's face occupying a high percentage of camera field of view 38. With the rider actuating snapshot buttons in each posture in the posture calibration screen of user interface 22 of application program (APP) 23, the occupation percentage of the rider's face to the camera field of view is recorded and subsequently used to identify rider's posture in real time for more accurate wind resistance calculations necessary for acceptable power computations of the effort exerted by the rider while cycling. It needs to be additionally stressed that advanced riders do often assume alternate postures where the rider's face is outside the field of view of the camera notwithstanding visibility of face features when they assume, however infrequently, an upright posture where the rider face is invariably visible to camera 21. Consequentially, in order to handle such situations, application program (APP) 23 additionally incorporates two windows where riders can enter their aerodynamic resistance coefficients CdA's hereby defined as the rider frontal area multiplied by the rider drag coefficient, with both postures, the upright posture and the advanced posture typically known for advanced cyclists where this exception applies, leading to direct entry of both known CdA's and with the aforementioned aerodynamic calibration then boiling down to taking a snapshot of each posture. With at least the upright position where the face features of the rider are in the field of view of the camera, distinction is made by the advanced logic of application program (APP) 23 based on the visibility of the face of the rider, notwithstanding the low percentage of occupation of the field of view of the camera, for thereof straightforward implementation. Finally, it is clear that this apparatus might not be suitable where lighting conditions are inadequate as for example, when the sun is directly behind the face of the rider, or possibly riding at night in the dark, no further attempt to accommodate these rare conditions except for informing the rider that the camera is Offline. Further improvements in this apparatus although not clearly necessary would be the distinction between more than two states for riding posture using the same front camera 21 of the Bicycle Computer 19 or another possible implementation altogether using the infrared sensor of Bicycle Computer 19 for this task.

Going back to the pressure sensor implementation, as can be seen from FIGS. 7A & 7B, with the rider arms on the handlebars and the handlebar grips, a certain amount of shielding of the pressure sensor 20 of Bicycle Computer 19 from cross winds takes place making it somewhat immune to side wind as the arms of the rider serve to break the side wind flow to a certain degree although not as much as the rider's body to tailwind which is obscured from the Bicycle Computer pressure sensor altogether leading to the measurement of strictly that of the encroaching wind which is speed of the bicycle diminished by the tailwind under this condition. It is additionally at least arguable, that head wind at moderate angles, say up to 45 degrees would result in diminished pressure differential readings approximating the net resultant frontal component largely responsible for the resistance to front movement of the rider with any resultant inaccuracies thereof negatively affecting the accuracy of the disclosed apparatus under such conditions and therefore subject to further evaluation and notwithstanding that this result might be skewed to one side or another as the microphone opening used for pressure sensor 21 of Bicycle Computer 19 is invariably located on either side of center.

Figure 8:
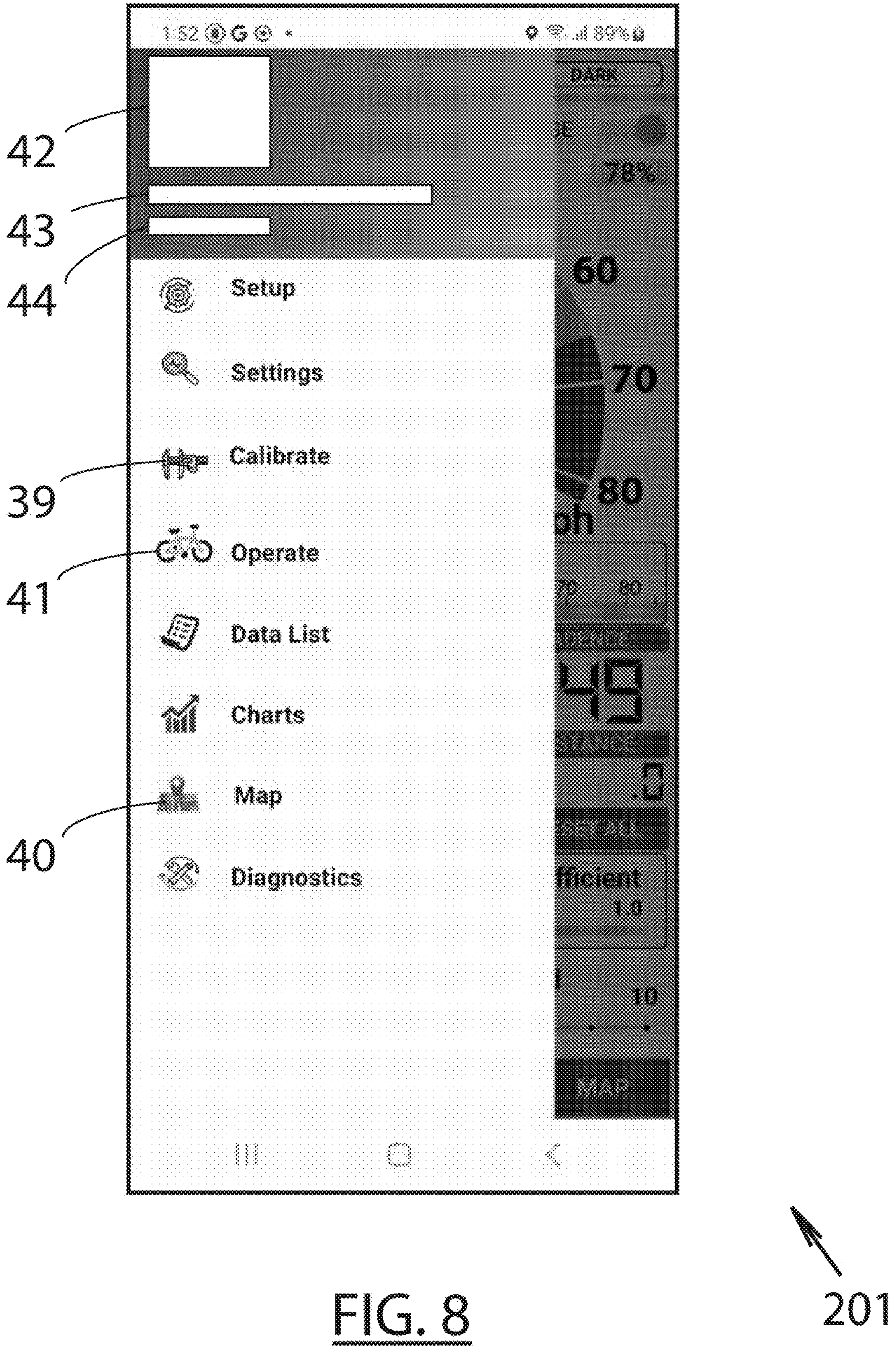
FIG. 8 is a view of the touchscreen application program slide drawer navigation screen for a bicycle making use of the preferred embodiment of the Bicycle Computer with Wind and Posture Sensing of the present invention.

Bicycle Computer Application Program—FIG. 8

With reference to FIG. 8, the Slide Drawer Application Program screen depicted in view 201 for the preferred embodiment Bicycle Computer with Wind and Posture Sensing of the present invention includes multiple functionalities available with a left to right swipe of the user's finger. As many of these features fall outside the scope of this disclosure, exception is hereby drawn for enumeration of only the features pertinent to this disclosure of application program (APP) 23 of Bicycle Computer 19 with functionality pertinent to this disclosure comprising calibration screen button 39 used for activation of calibration screen 203, map screen button 40 used for activation of map screen 202, and operation screen button 41 used for entry into operation screens 204 through 210. Last, the foregoing software implementation of this application includes placeholders for the original equipment manufacturer (OEM) logo 42, name 43 and internet portal 44.

Figure 9:
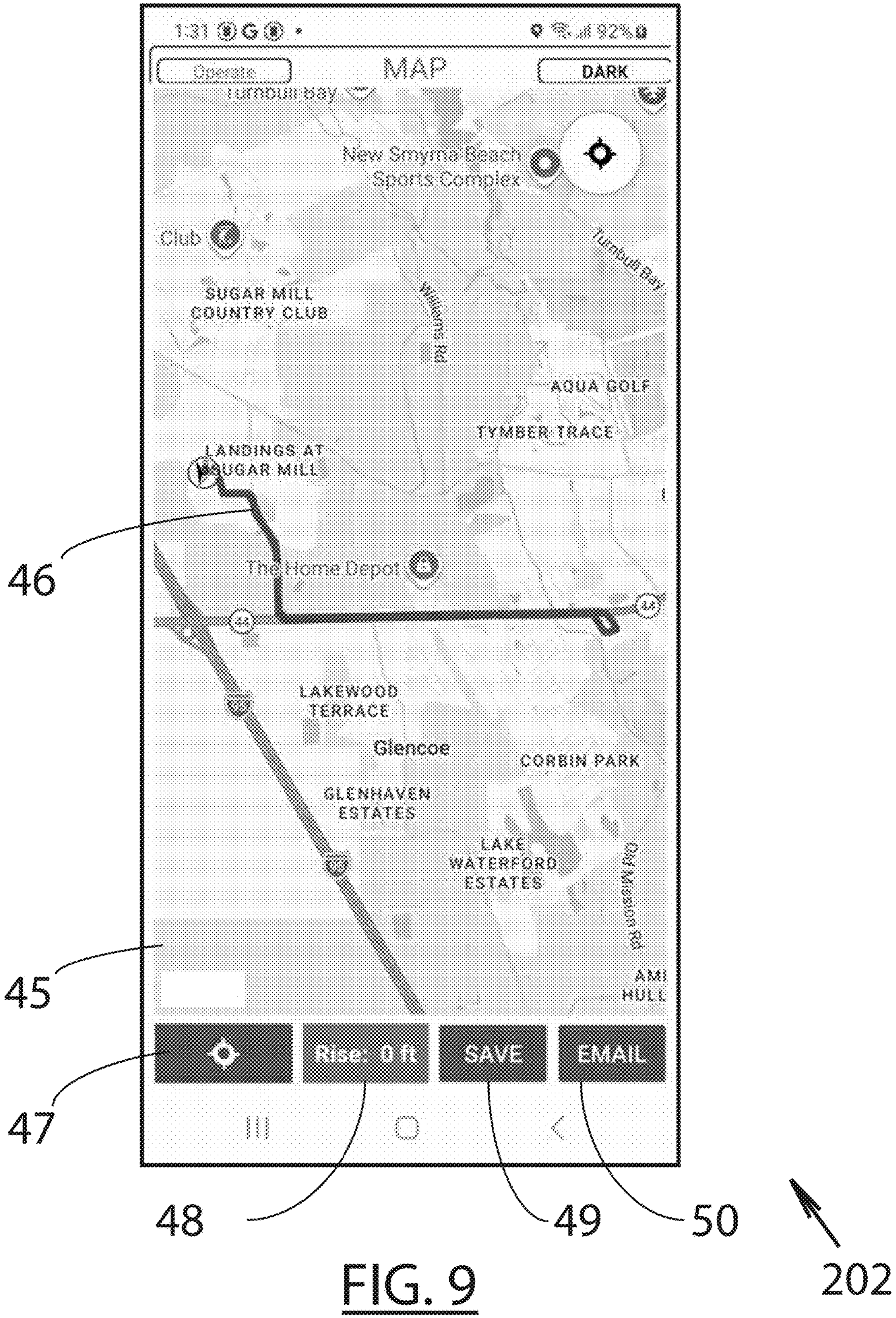
FIG. 9 is a screen view of the touchscreen application program depicting cyclist route mapping for a bicycle making use of the preferred embodiment of the Bicycle Computer with Wind and Posture Sensing of the present invention.

Rider Route Mapping—FIG. 9

With reference to FIG. 9, the route mapping functionality of Application Program (APP) 23 based on which the table in FIG. 6 was generated for a Bicycle Computer with Wind and Posture Sensing of the present invention is presented in view 202 comprising map 45 depicting current rider location, map route 46 overlaying map 45 is drawn upon rider activation of map view route button 47 to review trip route information, window 48 depicting elevation change in real time, button 49 serving to save the recorded route map depicted in view 202 along with rider recorded route table depicted in FIG. 6 onto the Bicycle Computer persistent memory, and button 50 serving to send the map and table rider metrics to the saved email address in application program (APP) 23.

Figure 10:
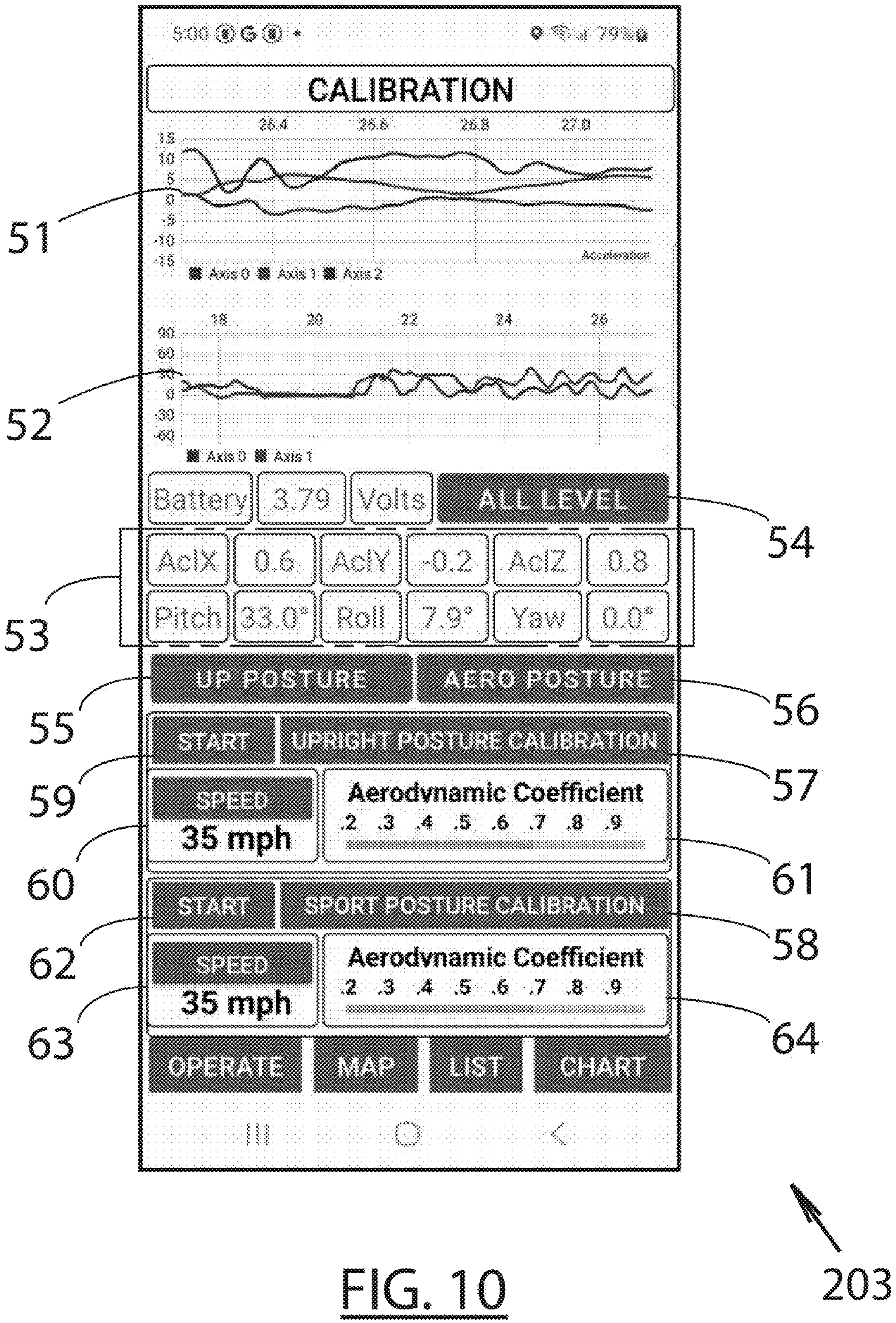
FIG. 10 is a view of the touchscreen application program devices and aerodynamic calibration screen for a bicycle making use of the preferred embodiment of the Bicycle Computer with Wind and Posture Sensing of the present invention.
Figure 11:
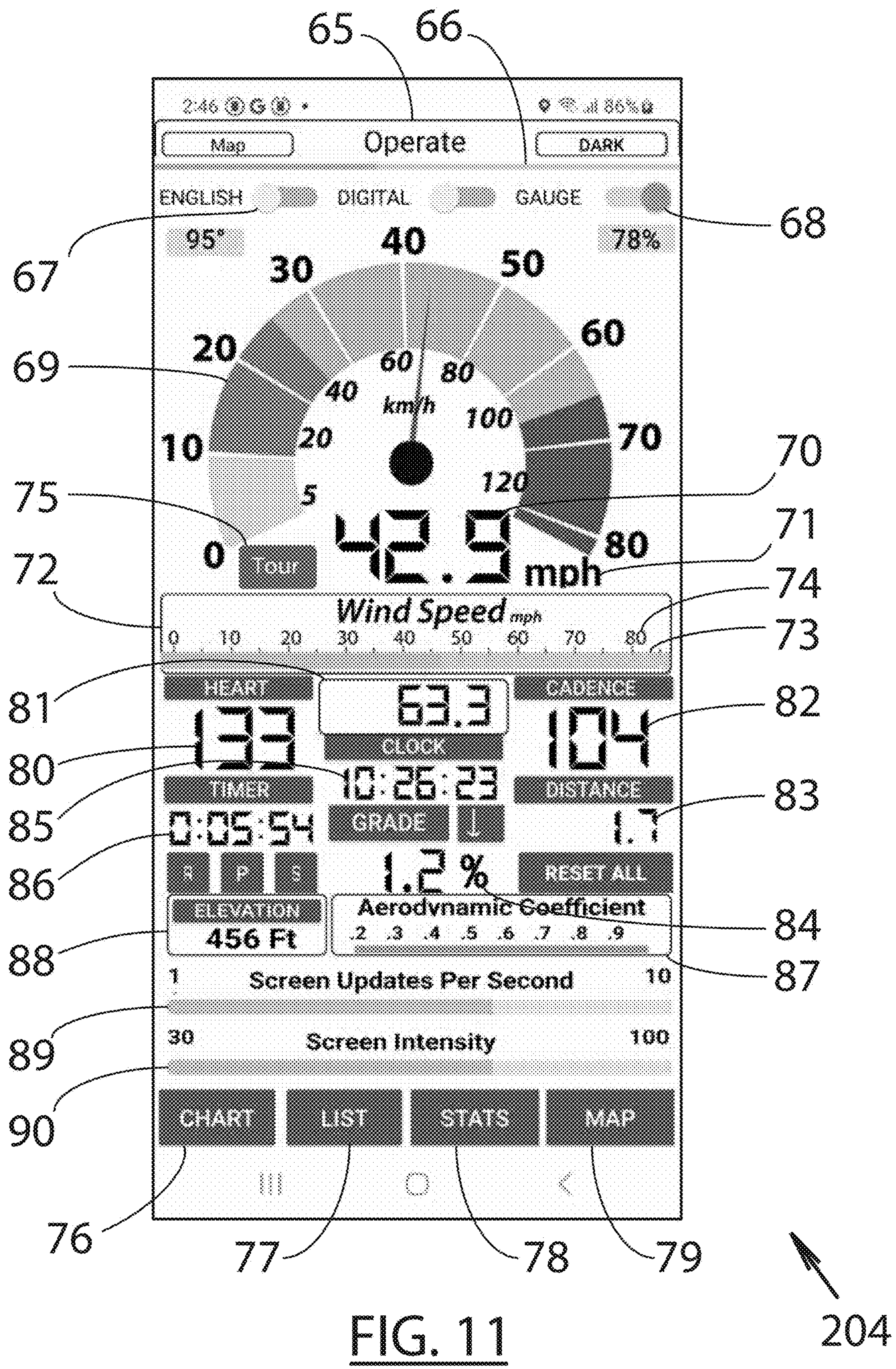
FIG. 11 is a view of the touchscreen application program in a bicycle operation "Tour" mode for the preferred embodiment of the Bicycle Computer with Wind and Posture Sensing of the present invention.
Figure 12:
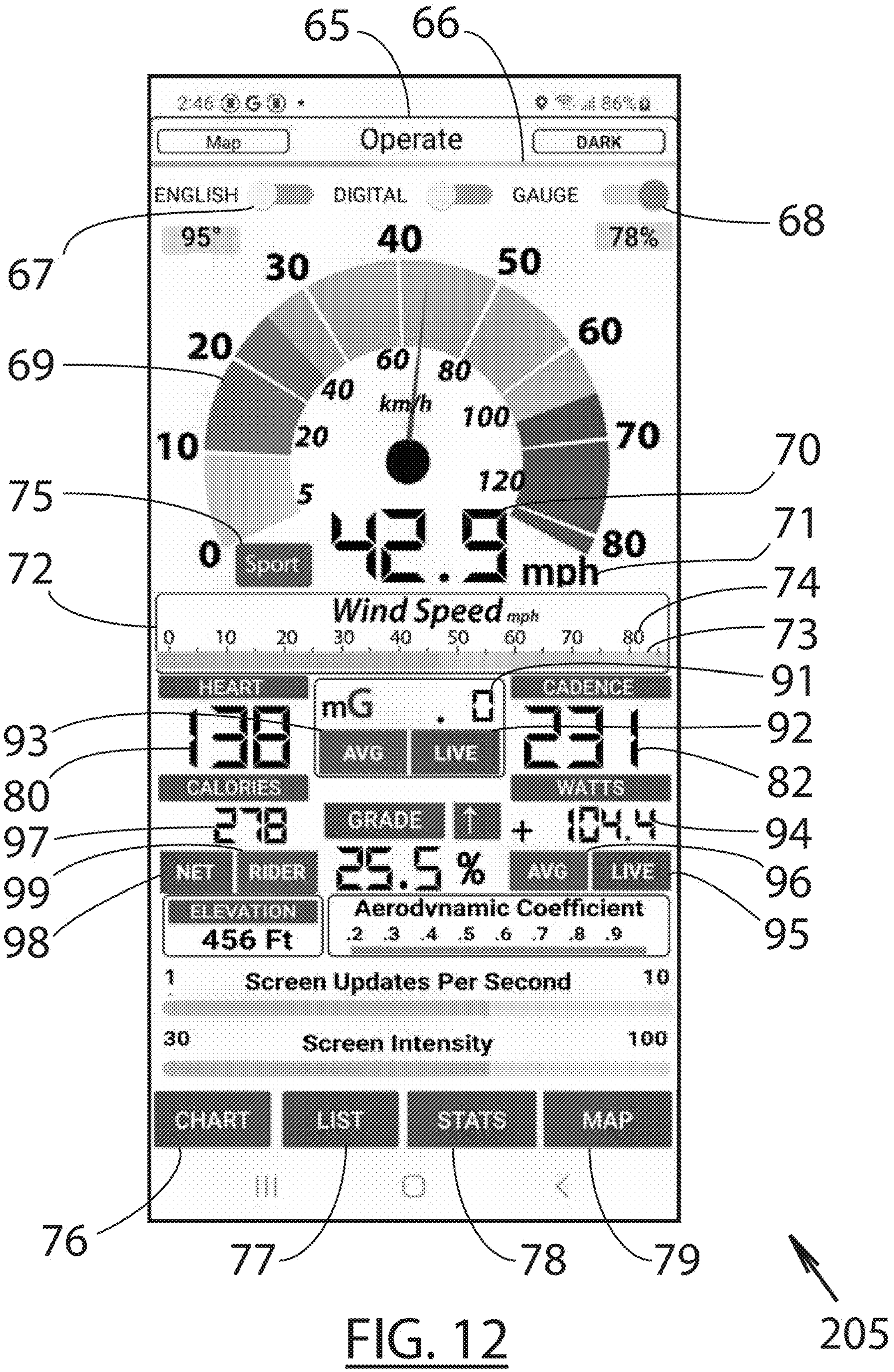
FIG. 12 is a view of the touchscreen application program in bicycle operation "Sport" mode for the preferred embodiment of the Bicycle Computer with Wind and Posture Sensing of the present invention.
Figure 13:
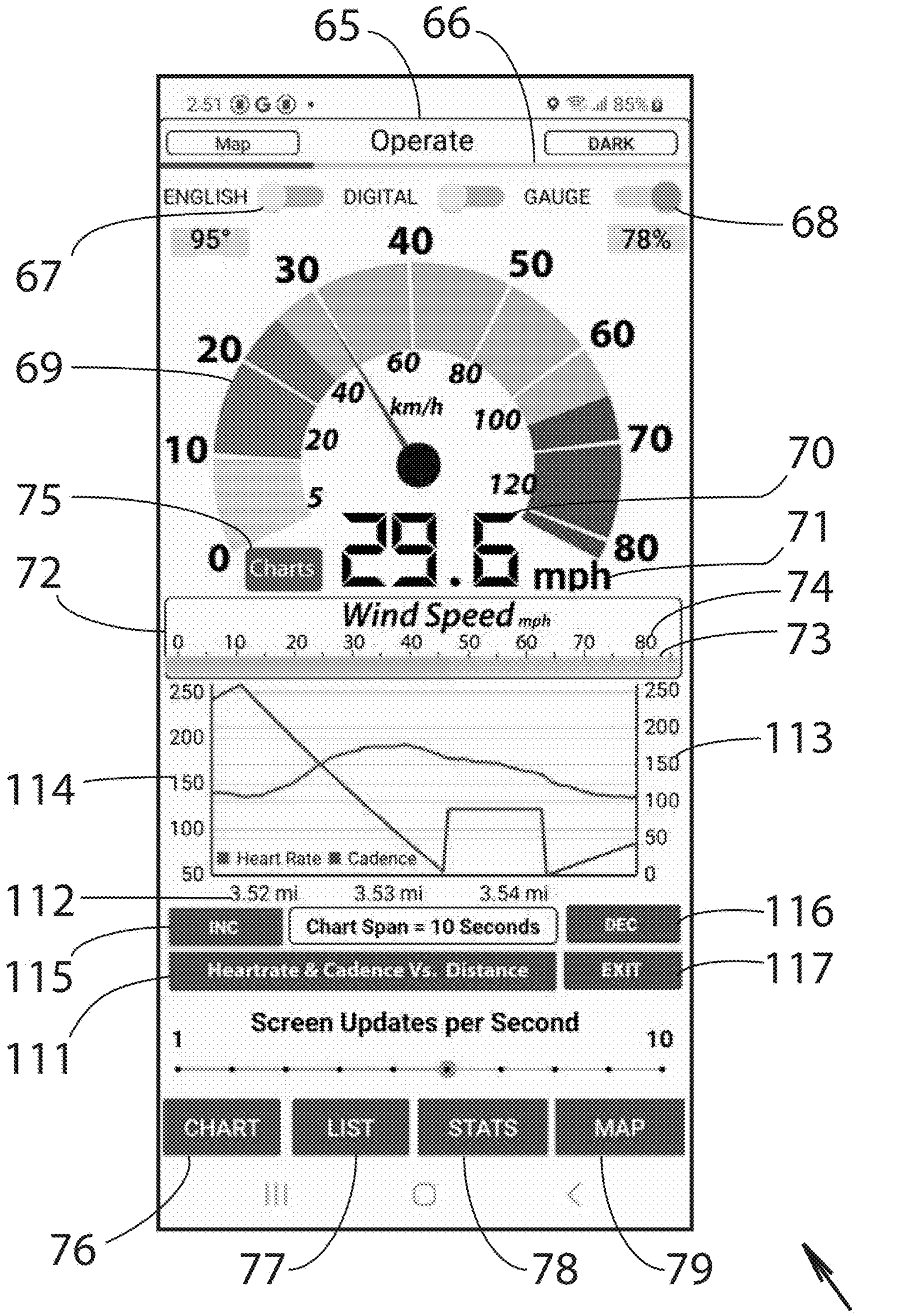
FIG. 13 is a view of the touchscreen application program in bicycle operation "Charts" mode depicting a chart of rider heart rate and cadence vs. traveled distance for the preferred embodiment of the Bicycle Computer with Wind and Posture Sensing of the present invention.
Figure 14:
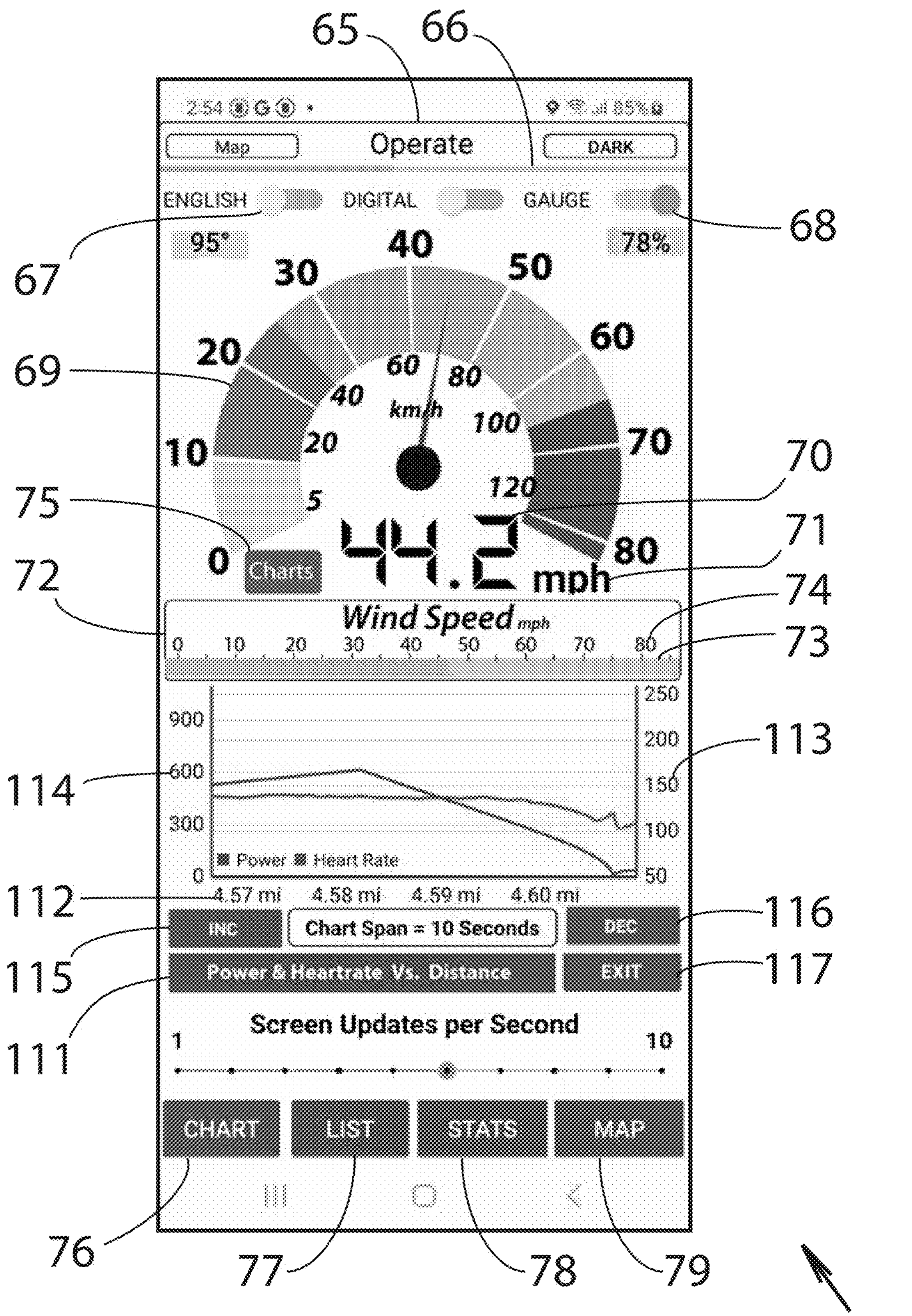
FIG. 14 is a view of the touchscreen application program in bicycle operation "Charts" mode depicting a chart of rider heart rate and power vs. traveled distance for the preferred embodiment of the Bicycle Computer with Wind and Posture Sensing of the present invention.
Figure 15:
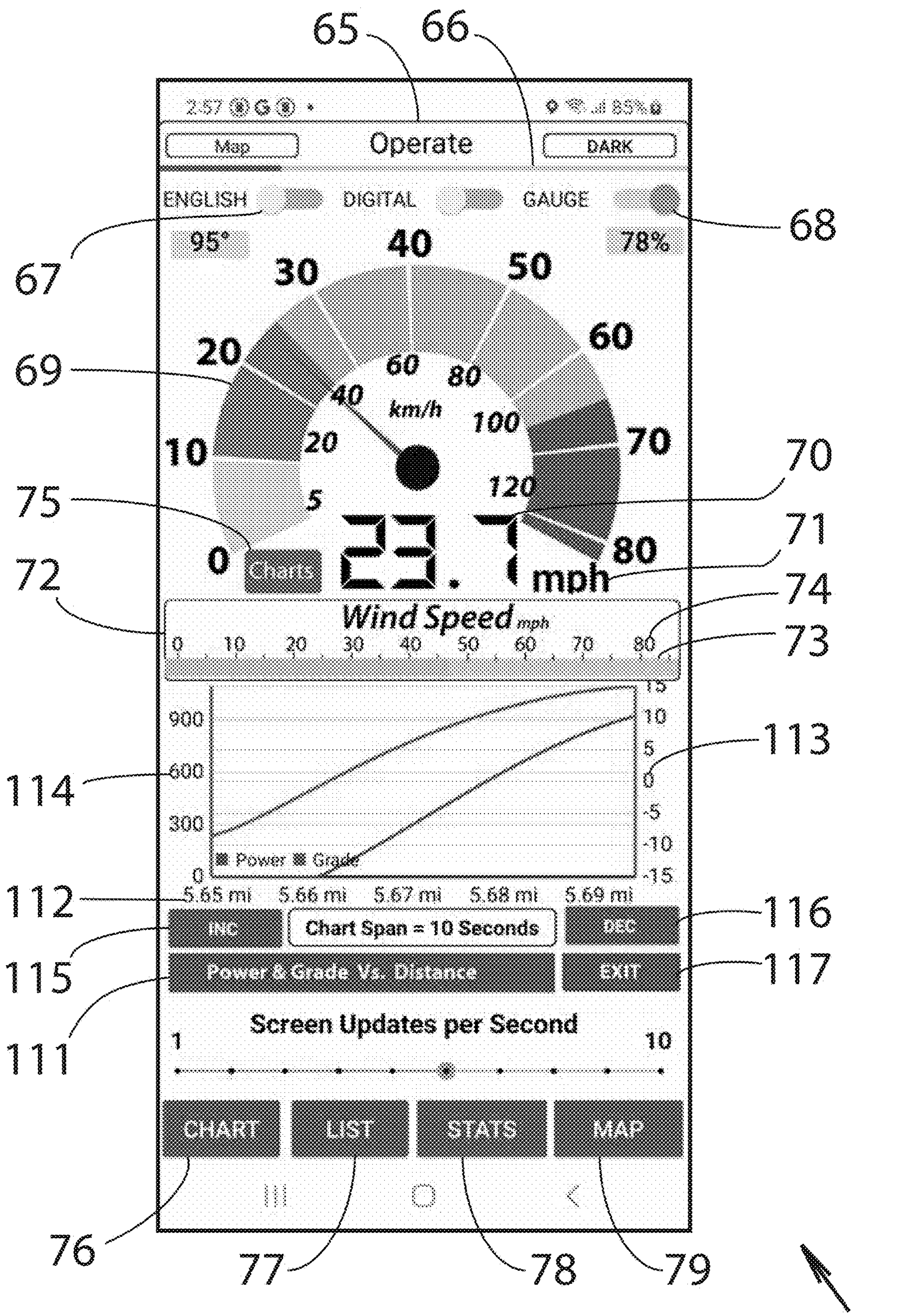
FIG. 15 is a view of the touchscreen application program in bicycle operation "Charts" mode depicting a chart of power and road grade vs. traveled distance for the preferred embodiment of the Bicycle Computer with Wind and Posture Sensing of the present invention.
Figure 16:
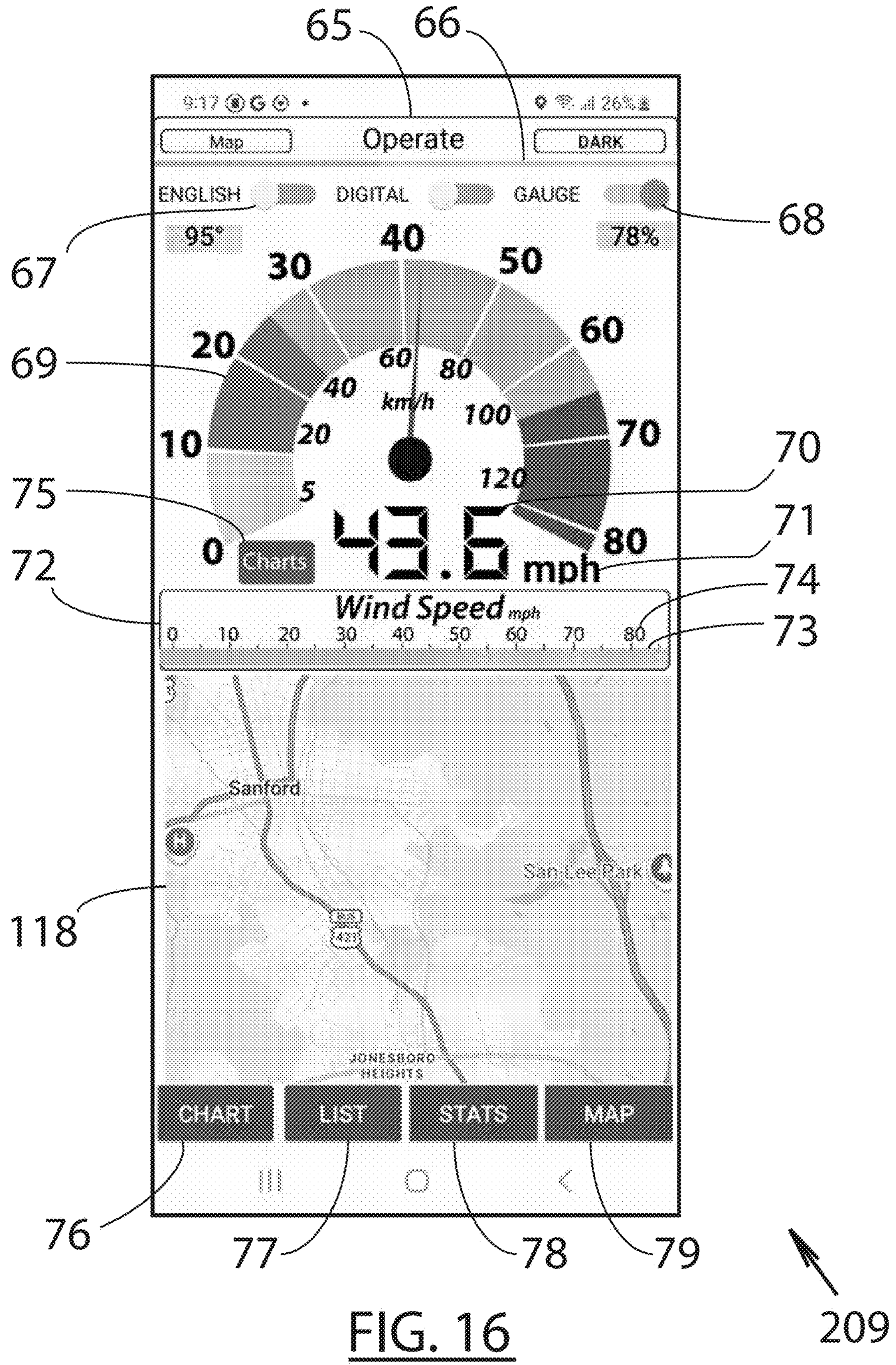
FIG. 16 is a view of the touchscreen application program in bicycle operation mode depicting mapping functionality of the preferred embodiment of the Bicycle Computer with Wind and Posture Sensing of the present invention.
Figure 17:
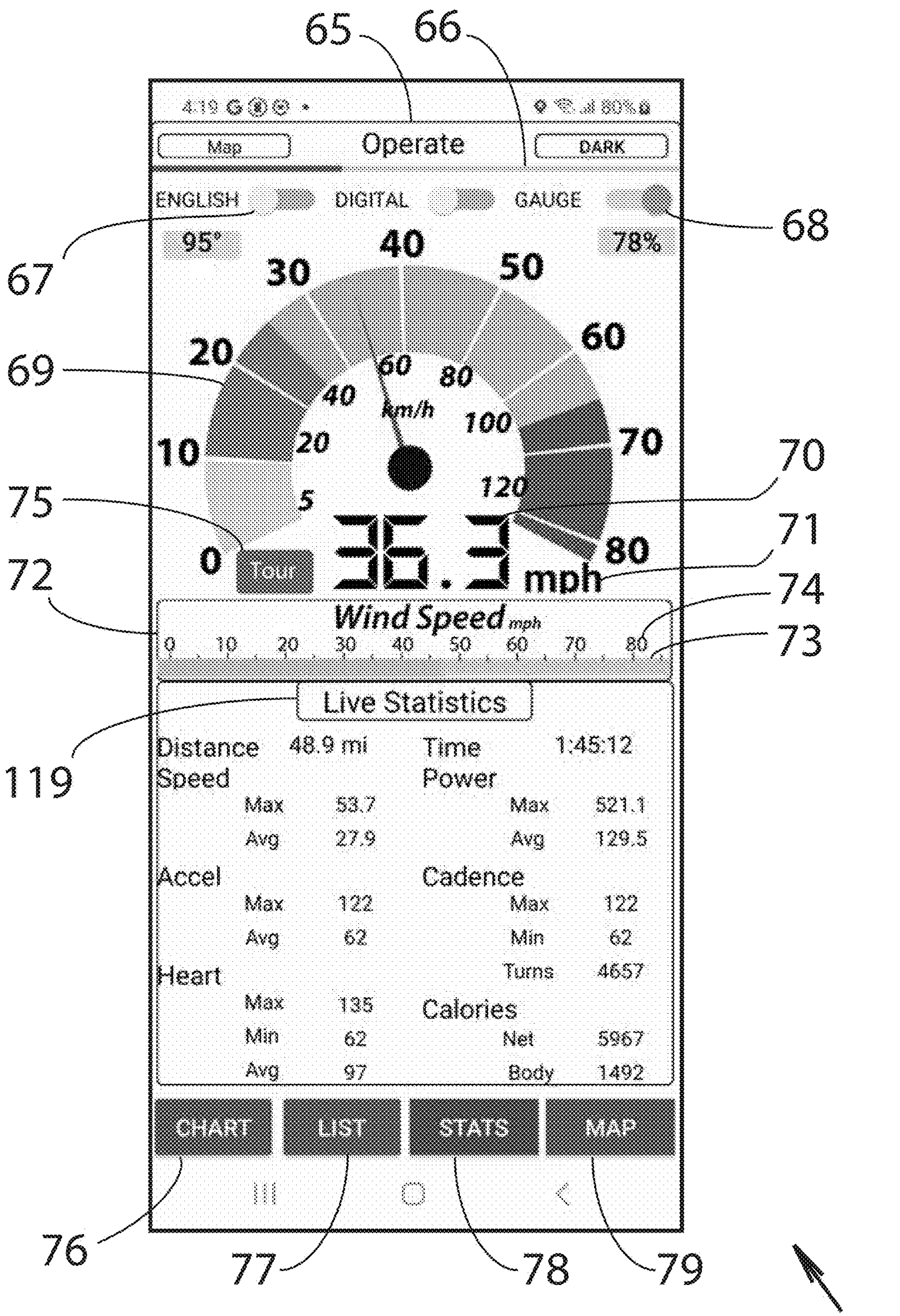
FIG. 17 is a view of the touchscreen application program in bicycle operation mode depicting rider real time trip statistics functionality of the preferred embodiment of the Bicycle Computer with Wind and Posture Sensing of the present invention.

Computer Devices and Aerodynamic Calibration—FIG. 10

With reference to FIG. 10, the inertial measurement unit (IMU), camera posture sensor, and aerodynamic calibration functionality of Application Program (APP) 23 for a Bicycle Computer with Wind and Posture Sensing of the present invention is depicted in view 203 with graph 51 depicting state of the three principal axes of inertial measurement unit (IMU) accelerometers in real time, and graph 52 depicting state of the pitch and roll of the inertial measurement unit (IMU) gyro also in real time with graph traces scrolling the viewing windows from right to left. Live state of accelerometers and gyro along principal axes (Yaw not used) with thereof readings depicted in box 53 which upon the rider pressing button 54 on a level road and in still condition serves to zero all measurements including the inclination position of Bicycle Computer 19 in standard bicycle mounting position. Calibration screen of FIG. 10 also includes button 55 which the rider presses while assuming an upright posture causing application program (APP) 23 to activate camera 21 to record the rider's face occupation of the front camera field of view and button 56 which the rider presses upon assuming an aerodynamic position where the face is closer to the camera with thereof button press causing application program (APP) 23 to record the percentage of occupation of the rider's face to the field of view of the camera. With both measurements of the recorded face to camera field of view percentage metric saved, they are subsequently used by application program (APP) 23 to identify the cyclist assumed riding posture.

The disclosed Bicycle Computer with Wind and Posture Sensing of the present invention also includes an apparatus for aerodynamic calibration for a cyclist profile through measurement of the rider's aerodynamic resistance coefficient which is defined as the rider frontal area of the rider multiplied by the rider air drag propensity stemming from rider's attire whether standard loose clothing or tight sportswear through measurement of deceleration of the rider from a nominal speed to another on a level road with no wind and with no actuation of the pedals. With the mass of the rider and bicycle known, and in lack of power input to the bicycle pedals and a zero wind condition, deceleration becomes predominantly related to air resistance with a simple computation based on the net change in momentum hereby defined as the total mass of the rider and bicycle times the speed. Accommodation of the only other force in play, the frictional retarding force in the tires and the wheel bearings of the bicycle, is accounted for through multiplication of the total mass of the rider and bicycle by the known approximation of coefficient of friction in the bicycle bearing of 0.05 with the rider being well informed that the bicycle wheel bearing must be in a well lubricated state with the tires properly inflated prior to initiation of the aerodynamic tests.

Performed upon the rider confirming a zero wind state and a road level condition, calibration takes place in two individual bicycle runs with rider assuming and upright posture in the first and an aerodynamic sport posture in the second. As can be seen in view 203, the aerodynamic calibration apparatus is duplicated under tag 57 for an upright posture and tag 58 for a sport posture with each including a start button, a speed reading window and a final calibration progress bar depicting the final rider aerodynamic coefficient result. Rider, henceforth is required to accelerate on a level road and in a zero wind condition to 35 mph and then decelerate without actuation of the bicycle pedals down to 20 mph. Rider presses start button 59 to initiate the upright posture calibration routine and ride bicycle in a straight line while observing speed window 60 depicting road speed wind down to 20 mph to conclude the test. Application program (APP) 23 measures rider wind resistance throughout this ride, calculates the rider's aerodynamic resistance coefficient as previously defined as the rider frontal area multiplied by the rider drag coefficient which is then displayed in the progress bar in window 61 upon conclusion of the calibration routine. The same procedure is then repeated for the sport posture apparatus with the rider pressing button 62 to initiate the sport or aerodynamic posture calibration routine and ride bicycle in a straight line while observing speed window 63 depicting road speed wind down to 20 mph to conclude the test with application program measuring the rider wind resistance, calculating the rider's aerodynamic resistance coefficient which is then displayed in the progress bar in window 64 upon conclusion of the sport posture calibration routine.

Bicycle Computer Operation Screens—FIGS. 11-17

With reference to FIGS. 10-17, the operation functionality of the Bicycle Computer with Wind and Posture Sensing of the present invention is henceforth defined with presented features and characteristics limited to pertinence to this disclosure. Features common to FIGS. 11-17 comprise Operation mode tag 65, battery charge progress bar 66, Units Switch 67 serving to alternate display between English and Metric units, Display Switch 68 serving to alternate display between analogue and numerical display, analogue speed gauge 69 with smaller numerical display 70 and units 71, wind gauge 72 depicting the wind speed on progress bar 73 with graduations 74 available in both English as well as Metric units depending on settings of Units switch 67, Mode Button 75 serving to alternate display between Tour Mode Screen depicted in View 204, Sport Mode Screen depicted in view 205 and Charts Mode Screens depicted in views 206-208, with navigation button 76 serving to switch display to view including all available Charts (view not shown), button 77 for display of rider trip list (view not shown), stats button 78 serving to switch display to statistics view 210 and map button 79 serving to switch display to map view 209.

With reference to FIG. 11 again, the Bicycle Computer with Wind and Posture Sensing of the present invention further includes view 204 activated by setting mode switch 75 to Tour mode for thereof depiction of real time heart rate display window 80, odometer 81, real time cadence display window 82, distance window 83 depicting distance traveled since start of application program (APP) 23, real time road percent grade window 84, real time clock 85, timer 86, current real time aerodynamic coefficient 87, real time elevation 88, screen selectable refresh rates through progress bar 89 with an update range of 1 to 10 Hertz, and screen selectable intensity through progress bar 90 with continuous setting between 30 percent and 100 percent.

With reference to FIG. 12 again, the Bicycle Computer with Wind and Posture Sensing of the present invention further includes view 205 activated by setting mode switch 75 to Sport mode for thereof duplication of depiction of real time heart rate display window 80 and real time cadence display window 82 due to their importance to the cyclist, forward acceleration window 91 with setting in milli "G" or "mG", the gravitational constant divided by 1000 for a scale very closely resembling accelerations in centimeters per second square suitable for cycling, with the acceleration scale automatically switching to a "G" scale, the gravitational constant for depiction of decelerations on that order attainable by a cyclist during hard braking and also during sharp turns thereof generating high centripetal forces, and with acceleration window 91 further depicting real time acceleration attained by a direct but averaged read of accelerometers 28 along the forward direction of Bicycle Computer 19 over a very short period in time, on the order of 100 millisecond, through depressing Live button 92 as well as average acceleration computed over a pre-specified interval attained through averaging of changes in readings of speed sensor 18 over pre-specified intervals, on the order of 1 second through depressing AVG button 93, watts window 94 depicting power expended by the cyclist available in real time with instantaneous power activated through depressing of Live button 95 with watts value switchable to a running average throughout the ride of the cyclist attained by depressing AVG button 96, calories window 97 depicting cumulative power expended throughout the ride with a value depicting total theoretical expended power attained by depressing Net button 98 or alternately expended power by the cyclist typically four times the net power due to human inefficiencies attained by depressing Rider button 99.

With reference to FIGS. 13-15 again, the Bicycle Computer with Wind and Posture Sensing of the present invention further includes views 206-208 activated by setting mode switch 75 to Charts mode for thereof depiction of Rider Heart Rate vs. Cadence chart as function of distance traveled through button 111 serving to alternate viewed charts between Rider Heart Rate vs. Cadence as a function of time chart (not shown), Rider Heart Rate vs. Cadence as a function of distance chart depicted in view 206, Rider Heart Rate vs. Power as a function of time chart (not shown), Rider Heart Rate vs. Power as a function of distance traveled chart depicted in view. 207, and finally Rider Power vs. Grade as a function of distance chart depicted in view 208, with all charts shown depicting distance traveled on the chart X-Axis 112 with mapped values of Heart Rate, Cadence, Power and Grade on Right Y-Axis 113 and left Y-Axis 114. All charts are viewable in spans of 10 seconds, 30 seconds, 1 minute, 15 minutes and 1 hour through chart increment button 115 and chart decrement button 116 with exit button 117 serving to exit chart mode.

With reference to FIGS. 16-17 again, the Bicycle Computer with Wind and Posture Sensing of the present invention further includes view 209 depicting map 118 of rider location through activation of button 79 and view 210 depicting real time running ride statistics 119 for the rider through activation of Stats button 78.

The invention claimed is:

1. A wind speed computer for a bicycle, comprising:

a) a structural bicycle mount for mechanical anchor of a mobile computing platform to a bicycle steering structure in an open atmospheric area with longitudinal axis of said mobile computing platform thereof disposed at a pre-specified angle of attack to a forward travel vector of said bicycle;

b) a mobile computing platform secured within said structural bicycle mount, said mobile computing platform comprising:

1) A hardware micro-electro-mechanical system (MEMS) atmospheric pressure sensor disposed at an internal sensor port of said mobile computing platform;

2) A global positioning sensor (GPS) receiver;

3) A temperature sensor;

4) A graphical touchscreen user interface;

5) A hardware processor; and

6) A non-transitory computer-readable memory;

c) an aerodynamic software application stored in said non-transitory computer-readable memory for execution thereof by said hardware processor, said aerodynamic software application comprising specialized algorithmic instructions including:

i) a base pressure storage module for identification of a zero-velocity condition of said bicycle via said global positioning sensor GPS receiver, and for sequentially storing a bicycle zero-velocity barometric reference value (P_0) from said MEMS atmospheric pressure sensor in said non-transitory computer-readable memory;

ii) a pressure differential tracking module for determination of a pressure differential (Delta P) for said bicycle via a mathematical subtraction of said stored bicycle zero-velocity barometric reference value P_0 from an active, real-time barometric measurement (P_live) from said MEMS atmospheric pressure sensor;

iii) a temperature-uncompensated air speed-computation module for derivation of an instantaneous temperature-uncompensated impending air speed component (U_air) through a mathematical iteration predominantly based on a mathematical square root of said pressure differential Delta P;

iv) an air speed temperature-compensation module for conversion of said temperature-uncompensated impending air speed component U_air into a temperature-compensated air speed component (V_air) through a relation based on input of said temperature sensor; and v) a graphical rendering subsystem for driving an enumerated visualization routine with a graphical speed indicator for display of said temperature-compensated air speed component V_air on said graphical touchscreen user interface.

2. The wind speed computer for a bicycle of claim 1, wherein said graphical touchscreen user interface further includes a first toggle for activation of additional specialized algorithmic instructions for estimation of said aerodynamic resistance coefficient (C_dA) for a bicycle rider through measurement of a rate of linear deceleration of said bicycle on a level road, under no-wind conditions and with no-power input to pedals of said bicycle by said bicycle rider; wherein said specialized algorithmic instructions for estimation of said aerodynamic resistance coefficient further comprise a first routine for estimation of a first aerodynamic resistance coefficient (C_dAu) corresponding to an upright posture of said bicycle rider, and a second routine for estimation of a second aerodynamic resistance coefficient (C_dAa) corresponding to an aerodynamic posture of said bicycle rider.

3. The wind speed computer for a bicycle of claim 2, wherein said mobile computing platform further includes an inertial measurement unit (IMU) and an inclination gyroscope, and wherein said graphical touchscreen user interface further includes a second toggle for activation of additional specialized algorithmic instructions for estimation of a real-time mechanical power output value for said bicycle rider through a closed-form physics computation predominantly based on speed updates by said global positioning sensor GPS receiver of said bicycle compounded by summation of following forces:

a) inertial acceleration force predominantly based on output of said inertial measurement unit IMU resolved in a forward direction of said bicycle against a total user-specified system mass value stored in said non-transitory computer-readable memory;

b) gravitational climbing force predominantly based on inclination measurements of said inclination gyroscope over a running distance interval against said total user-specified system mass value; and c) instantaneous aerodynamic resistance force predominantly based on an active selection between said first aerodynamic resistance coefficient C_dAu, corresponding to said upright posture of said bicycle rider and said second aerodynamic resistance coefficient C_dAa, corresponding to said aerodynamic posture of said bicycle rider, applied against said temperature-compensated air speed component V_air.

4. The wind speed computer for a bicycle of claim 3, wherein said mobile computing platform further comprises a rider-features optical camera sensor; and wherein said aerodynamic software application comprises further algorithmic instructions including:

a) a rider-features capture routine for capture of a first calibration image via said rider-features optical camera sensor for an upright posture of said bicycle rider, and a second calibration image via said rider-features optical camera sensor for an aerodynamic posture of said bicycle rider;

b) a features area mapping routine for real-time computation of a percent occupation of facial features of said bicycle rider within a field of view of said rider-features optical camera sensor, and a mapping of said real-time computation to either of said first calibration image corresponding to said upright posture of said bicycle rider or said second calibration image corresponding to said aerodynamic posture of said bicycle rider;

c) a dynamic parameter memory-mapping routine for real-time update of said specialized algorithmic instructions for estimation of a real-time mechanical power output value for said bicycle rider with said first aerodynamic resistance coefficient C_dAu, corresponding to said upright posture of said bicycle rider, and said second aerodynamic resistance coefficient C_dAa, corresponding to said aerodynamic posture of said bicycle rider; and d) a graphical rendering subsystem for driving an enumerated visualization routine for real-time display of said first aerodynamic resistance coefficient C_dAu, corresponding to said upright posture of said bicycle rider, and said second aerodynamic resistance coefficient C_dAa, corresponding to said aerodynamic posture of said bicycle rider.

5. A computer-vision driven rider posture parsing apparatus for a bicycle, comprising:

a) a structural bicycle mount for mechanical anchor of a mobile computing platform to a bicycle steering structure in an open atmospheric area and oriented to face a bicycle rider;

b) a mobile computing platform secured within said structural bicycle mount, said mobile computing platform further comprising:

1) A rider-features optical camera sensor;

2) A hardware processor;

3) A graphical touchscreen user interface; and

4) A non-transitory computer-readable memory;

c) a posture profiling application stored in said non-transitory computer-readable memory for execution thereof by said hardware processor, said posture profiling application comprising specialized algorithmic instructions including:

i) a rider-features capture routine for capture of a first calibration image via said rider-features optical camera sensor for an upright posture of said bicycle rider, and a second calibration image via said rider-features optical camera sensor for an aerodynamic posture of said bicycle rider;

ii) a features area mapping routine for real-time computation of a percent occupation of facial features of said bicycle rider within a field of view of said rider-features optical camera sensor, and a mapping of said real-time computation to either of said first calibration image corresponding to said upright posture of said bicycle rider or said second calibration image corresponding to said aerodynamic posture of said bicycle rider; and iii) a dynamic real-time parameter update module for real-time structural data switch of an aerodynamic resistance coefficient (C_dA) between a first pre-recorded numerical value (C_dAu) corresponding to said upright posture for said bicycle rider and a second pre-recorded numerical value (C_dAa) corresponding to said aerodynamic riding posture for said bicycle rider.

6. The computer-vision driven posture parsing apparatus for a bicycle of claim 5, further comprising:

a) a hardware micro-electro-mechanical system (MEMS) atmospheric pressure sensor positioned at an internal sensor port of said mobile computing platform;

b) a global positioning sensor (GPS) receiver integrated within said mobile computing platform;

c) a temperature sensor integrated within said mobile computing platform; and d) further specialized algorithmic instructions within said posture profiling application including:

i) a base pressure storage module for identification of a zero-velocity condition of said bicycle via said GPS receiver, and for sequentially storing a bicycle zero-velocity barometric reference value (P_0) from said MEMS atmospheric pressure sensor in said non-transitory computer-readable memory;

ii) a pressure differential tracking module for determination of a pressure differential (Delta P) for said bicycle via a mathematical subtraction of said stored bicycle zero-velocity barometric reference value P_0 from an active, real-time barometric measurement (P_live) from said MEMS atmospheric pressure sensor;

iii) a temperature-uncompensated air speed computation module for derivation of an instantaneous temperature-uncompensated impending air speed component (U_air) through a mathematical iteration predominantly based on a mathematical square root of said pressure differential Delta P;

iv) an air speed temperature-compensation module for conversion of said temperature-uncompensated impending air speed component U_air into a temperature-compensated air speed component (V_air) through a relation based on input of said temperature sensor; and v) a graphical rendering subsystem for driving an enumerated visualization routine with a graphical speed indicator for display of said temperature-compensated air speed component V_air on said graphical touchscreen user interface.

7. The computer-vision driven posture parsing apparatus for a bicycle of claim 6, wherein said graphical touchscreen user interface further includes a first toggle for activation of additional specialized algorithmic instructions for estimation of said aerodynamic resistance coefficient C_dA for a bicycle rider through measurement of a rate of linear deceleration of said bicycle on a level road, under no-wind conditions and with no-power input to pedals of said bicycle by said bicycle rider; wherein said specialized algorithmic instructions for estimation of said aerodynamic resistance coefficient further comprise a first routine for estimation of said first aerodynamic resistance coefficient C_dAu corresponding to said upright posture of said bicycle rider, and a second routine for estimation of said second aerodynamic resistance coefficient C_dAa corresponding to said aerodynamic posture of said bicycle rider.

8. The computer-vision driven posture parsing apparatus for a bicycle of claim 7, wherein said mobile computing platform further includes an inertial measurement unit (IMU) and an inclination gyroscope, and wherein said graphical touchscreen user interface further includes a second toggle for activation of additional specialized algorithmic instructions for estimation of a real-time mechanical power output value for said bicycle rider through a closed-form physics computation predominantly based on speed updates by said global positioning sensor GPS receiver of said bicycle compounded by summation of following forces:

a) inertial acceleration force predominantly based on output of said inertial measurement unit IMU resolved in a forward direction of said bicycle against a total user-specified system mass value stored in said non-transitory computer-readable memory;

b) gravitational climbing force predominantly based on inclination measurements of said inclination gyroscope over a running distance interval against said total user-specified system mass value; and c) instantaneous aerodynamic resistance force predominantly based on an active selection between said first aerodynamic resistance coefficient C_dAu, corresponding to said upright posture of said bicycle rider, and said second aerodynamic resistance coefficient C_dAa, corresponding to said aerodynamic posture of said bicycle rider, applied against said temperature-compensated air speed component V_air.

9. A hardware-implemented data processing method for estimation of power exerted by a bicycle rider in real-time, comprising:

a) providing a mobile computing platform comprising:

1) A hardware micro-electro-mechanical system (MEMS) atmospheric pressure sensor disposed at an internal sensor port of said mobile computing platform;

2) A global positioning sensor (GPS) receiver;

3) A temperature sensor;

4) An inertial measurement unit (IMU) including a multi-axis hardware accelerometer array;

5) An inclination gyroscope;

6) A rider-features optical camera sensor;

7) A graphical touchscreen user interface;

8) A hardware processor; and

9) A non-transitory computer-readable memory;

b) securing said mobile computing platform within a structural bicycle mount mechanically anchored to a bicycle steering structure in an open atmospheric area with a longitudinal axis of said mobile computing platform disposed at a pre-specified angle of attack to a forward travel vector of said bicycle;

c) providing a rider power estimation software application with pressure-sensing and air-speed computation routines within said non-transitory computer-readable memory, comprising:

1) A base pressure storage routine for identification of a zero-velocity condition of said bicycle via said GPS receiver, and for sequentially storing a bicycle zero-velocity barometric reference value (P_0) from said MEMS atmospheric pressure sensor;

2) A pressure differential tracking routine for determination of a pressure differential (Delta P) for said bicycle via a mathematical subtraction of said stored bicycle zero-velocity barometric reference value P_0 from an active, real-time barometric measurement (P_live) from said MEMS atmospheric pressure sensor;

3) A temperature-uncompensated air speed-computation routine for derivation of an instantaneous temperature-uncompensated impending air speed component (U_air) through a mathematical iteration predominantly based on a mathematical square root of said pressure differential Delta P; and 4) An air speed temperature-compensation routine for conversion of said temperature-uncompensated impending air speed component U_air into a temperature-compensated air speed component (V_air) through a relation based on input of said temperature sensor;

d) providing said rider power estimation software application with rider aerodynamic calibration routines within said non-transitory computer-readable memory, comprising:

1) An interactive user interface selection routine driven by a first toggle on said graphical touchscreen user interface for activation of additional specialized algorithmic instructions for estimation of an aerodynamic resistance coefficient (C_dA) for said bicycle rider through measurement of a rate of linear deceleration of said bicycle on a level road, under no-wind conditions and with no-power input to pedals of said bicycle by said bicycle rider;

2) A first calibration estimation routine for estimation of a first aerodynamic resistance coefficient (C_dAu) corresponding to an upright posture of said bicycle rider; and 3) A second calibration estimation routine for estimation of a second aerodynamic resistance coefficient (C_dAa) corresponding to an aerodynamic posture of said bicycle rider;

e) providing said rider power estimation software application with camera-driven rider posture parsing routines within said non-transitory computer-readable memory, comprising:

1) A rider-features capture routine for capture of a first calibration image via said rider-features optical camera sensor for said upright posture of said bicycle rider, and a second calibration image via said rider-features optical camera sensor for said aerodynamic posture of said bicycle rider;

2) A features area mapping routine for real-time computation of a percent occupation of facial features of said bicycle rider within a field of view of said rider-features optical camera sensor, and a mapping of said real-time computation to either of said first calibration image corresponding to said upright posture of said bicycle rider or said second calibration image corresponding to said aerodynamic posture of said bicycle rider; and 3) A dynamic real-time parameter update routine for real-time structural data switch of said aerodynamic resistance coefficient C_dA between a first pre-recorded numerical value C_dAu, corresponding to said upright posture of said bicycle rider, and a second pre-recorded numerical value C_dAa, corresponding to said aerodynamic posture of said bicycle rider;

f) providing said rider power estimation software application with arithmetic instructions for estimation of a real-time mechanical power output value (P_rider) for said bicycle rider within said non-transitory computer-readable memory, through a closed-form physics computation predominantly based on speed updates by said GPS receiver of said bicycle compounded by summation of the following forces:

1) An inertial acceleration force predominantly based on output of said IMU resolved in a forward direction of said bicycle against a total user-specified system mass value stored in said non-transitory computer-readable memory;

2) A gravitational climbing force predominantly based on inclination measurements of said inclination gyroscope over a running distance interval against said total user-specified system mass value; and 3) An instantaneous aerodynamic resistance force predominantly based on an active selection between said first aerodynamic resistance coefficient C_dAu, corresponding to said upright posture of said bicycle rider, and said second aerodynamic resistance coefficient C_dAa, corresponding to said aerodynamic posture of said bicycle rider, applied against said temperature-compensated air speed component V_air; and g) providing said rider power estimation software application with graphical touchscreen user interface driving routines within said non-transitory computer-readable memory, comprising:

1) An enumerated visualization routine driven by a graphical rendering subsystem for real-time display of said resolved real-time mechanical power output value P_rider on said graphical touchscreen user interface; and 2) A graphical speed indicator routine driven by said graphical rendering subsystem for real-time display of said temperature-compensated air speed component V_air on said graphical touchscreen user interface.

* * * * *